United States Patent
Balasubramanian et al.

(10) Patent No.: US 10,262,347 B1
(45) Date of Patent: Apr. 16, 2019

(54) MANAGING CHANNELS IN AN INTERNET-BASED CONTENT PLATFORM

(71) Applicant: Google LLC, Mountain View, CA (US)

(72) Inventors: Prabhu Balasubramanian, Mountain View, CA (US); John Thomas, Mountain View, CA (US); Akash Hasmukh Parikh, Mountain View, CA (US); Natalia Ann Cohen Fisher, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 854 days.

(21) Appl. No.: 13/972,413

(22) Filed: Aug. 21, 2013

Related U.S. Application Data

(60) Provisional application No. 61/821,229, filed on May 8, 2013.

(51) Int. Cl.
| | | |
|---|---|---|
| *G06F 21/10* | (2013.01) | |
| *G06Q 30/06* | (2012.01) | |
| *H04N 21/472* | (2011.01) | |

(52) U.S. Cl.
CPC ......... *G06Q 30/0601* (2013.01); *G06F 21/10* (2013.01); *H04N 21/472* (2013.01)

(58) Field of Classification Search
CPC ... G06F 21/10; G06Q 30/0601; H04N 21/472
See application file for complete search history.

(56) References Cited

U.S. PATENT DOCUMENTS

| | | | |
|---|---|---|---|
| 5,512,955 A | 4/1996 | Toyoshima et al. | |
| 5,585,866 A * | 12/1996 | Miller | A63F 13/12 348/570 |
| 5,790,198 A | 8/1998 | Roop et al. | |
| 6,215,530 B1 | 4/2001 | Wasilewski | |
| 6,314,572 B1 * | 11/2001 | LaRocca | G06Q 30/0207 348/E7.071 |
| 6,774,926 B1 * | 8/2004 | Ellis | H04N 5/44543 348/14.01 |
| 7,403,910 B1 | 7/2008 | Hastings et al. | |
| 8,185,096 B2 * | 5/2012 | Smith | H04M 3/4878 455/412.1 |
| 8,196,166 B2 | 6/2012 | Roberts et al. | |

(Continued)

OTHER PUBLICATIONS

"YouTube Help Forum: This video is not available in your country . . . I live in America" forum posts dated Oct. 4-5, 2009 (2 pages) https://productforums.google.com/forum/?hl=en#!category-topic/youtube/archive/yDVExPoltx0.*

(Continued)

*Primary Examiner* — Joseph P Hirl
*Assistant Examiner* — Thomas A Gyorfi
(74) *Attorney, Agent, or Firm* — Lowenstein Sandler LLP

(57) ABSTRACT

An internet-based content platform that includes subscribable channels is provided. The internet-based content platform provides channels to end users. The internet-based content platform allows a channel curator to create a paid channel and may include a plurality of media items including at least one paid media item and at least one free media item, in the paid channel. The internet-based content platform may also allow a channel curator to define a subscription fee and a duration for a subscription to the paid channel.

22 Claims, 25 Drawing Sheets

(56) References Cited

U.S. PATENT DOCUMENTS

| | | | |
|---|---|---|---|
| 8,522,289 B2 | 8/2013 | Athsani et al. | |
| 8,627,388 B2* | 1/2014 | Wood | H04N 21/25808 709/231 |
| 8,850,490 B1 | 9/2014 | Thomas et al. | |
| 9,288,249 B1 | 3/2016 | Chang et al. | |
| 9,374,610 B1* | 6/2016 | Chang | H04N 21/4312 |
| 9,560,400 B2 | 1/2017 | Thomas et al. | |
| 2001/0013052 A1 | 8/2001 | Benjamin et al. | |
| 2001/0014976 A1 | 8/2001 | Roop et al. | |
| 2002/0000748 A1 | 1/2002 | Rodriguez et al. | |
| 2003/0150847 A1* | 8/2003 | Troitski | B23K 26/0604 219/121.68 |
| 2005/0144024 A1 | 6/2005 | Wojton et al. | |
| 2006/0168507 A1 | 7/2006 | Hansen | |
| 2007/0039032 A1 | 2/2007 | Goldey et al. | |
| 2007/0154169 A1 | 7/2007 | Cordray et al. | |
| 2007/0198363 A1* | 8/2007 | Quoc | G06F 17/30864 705/26.1 |
| 2007/0204011 A1 | 8/2007 | Shaver et al. | |
| 2007/0219910 A1* | 9/2007 | Martinez | G06F 21/10 705/51 |
| 2008/0248788 A1* | 10/2008 | Smith | H04M 3/4878 455/414.3 |
| 2009/0061764 A1 | 3/2009 | Lockhart et al. | |
| 2009/0089184 A1* | 4/2009 | Boush | G06F 17/30017 705/26.1 |
| 2009/0144237 A1 | 6/2009 | Branam et al. | |
| 2010/0043045 A1 | 2/2010 | Shakiba et al. | |
| 2010/0146432 A1* | 6/2010 | Robbin | G07F 17/16 715/781 |
| 2011/0191163 A1* | 8/2011 | Allaire | G06Q 30/0239 705/14.39 |
| 2011/0214170 A1* | 9/2011 | Wu | G06F 21/10 726/7 |
| 2011/0239253 A1 | 9/2011 | West et al. | |
| 2011/0258049 A1 | 10/2011 | Ramer et al. | |
| 2011/0321072 A1* | 12/2011 | Patterson | H04N 21/44222 725/5 |
| 2012/0005704 A1 | 1/2012 | Debois et al. | |
| 2012/0136825 A1 | 5/2012 | Harris | |
| 2013/0013677 A1* | 1/2013 | Engstrom | H04L 67/2823 709/203 |
| 2013/0031579 A1 | 1/2013 | Klappert | |
| 2013/0326560 A1 | 12/2013 | Wang | |
| 2014/0032371 A1* | 1/2014 | Traina | G06Q 30/0637 705/26.81 |
| 2014/0068687 A1 | 3/2014 | Greenberg et al. | |
| 2014/0130182 A1* | 5/2014 | Yackanich | G06F 21/60 726/27 |
| 2014/0143835 A1* | 5/2014 | Brennan | G06F 17/217 726/4 |
| 2016/0342574 A1 | 11/2016 | Zhang et al. | |

OTHER PUBLICATIONS

Doug Sahlin, Chris Botello. "YouTube for Dummies®" Pub. Date Jul. 30, 2007 (pp. 60, 61, 74-78, 106-108).*

Matt Winn. "Dropdowns, Checkboxes, or Radio Buttons? A Quick Guide to Displaying Product Options" Published Jun. 25, 2012 (9 pages) https://www.volusion.com/blog/dropdowns-checkboxes-or-radio-buttons-a-quick-guide-to-displaying-product-options/.*

Wikipedia, "Now TV," Feb. 8, 2016, 5 pages, <https://en.wikipedia.org/wiki/Now_TV.

* cited by examiner

MANAGING CHANNELS IN AN INTERNET-BASED CONTENT PLATFORM

RELATED APPLICATION

This application claims priority to U.S. Provisional Patent Application No. 61/821,229, filed May 8, 2013, which is hereby incorporated by reference.

TECHNICAL FIELD

Embodiments of the present disclosure relate to the field of media consumption and, more particularly, to subscriptions to channels of an internet-based content platform.

BACKGROUND

Online content sharing platforms typically allow users to upload, view, and share digital content such as media items. Media items may include audio clips, movie clips, TV clips, music videos, images, or other multimedia content. Users may use computing devices (such as smart phones, cellular phones, laptop computers, desktop computers, netbooks, tablet computers) to use, play, and/or otherwise consume media items (e.g., watch digital videos, and/or listen to digital music).

Media items may be provided to a user through channels. A channel may include content available from a common source, or content having a common subject or theme. Currently, subscription mechanisms offered by media providers offer little or no flexibility to users and hinder the users' desire to quickly gain access to content of interest.

SUMMARY

The below summary is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one embodiment, a method of defining a paid channel in an internet-based content platform is provided. The method includes receiving, from a channel curator, a first input identifying at least one paid media item and at least one free media item to include in the paid channel. The method also includes associating the at least one paid media item and the at least one free media item with the paid channel. The method further includes receiving, from the channel curator, a second input indicating a subscription fee for a subscription to the paid channel and a duration of time for the subscription to the paid channel. The method also includes associating the subscription fee and the duration of time for the subscription with the paid channel.

In additional embodiments, computing devices for performing the operations described herein are also implemented. Additionally, in embodiments of the disclosure, a computer readable storage media stores instructions for performing the operations of the above described embodiments. In other implementations, an apparatus that includes means for performing the operations described herein are also implemented

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only.

DETAILED DESCRIPTION

Figure 1:
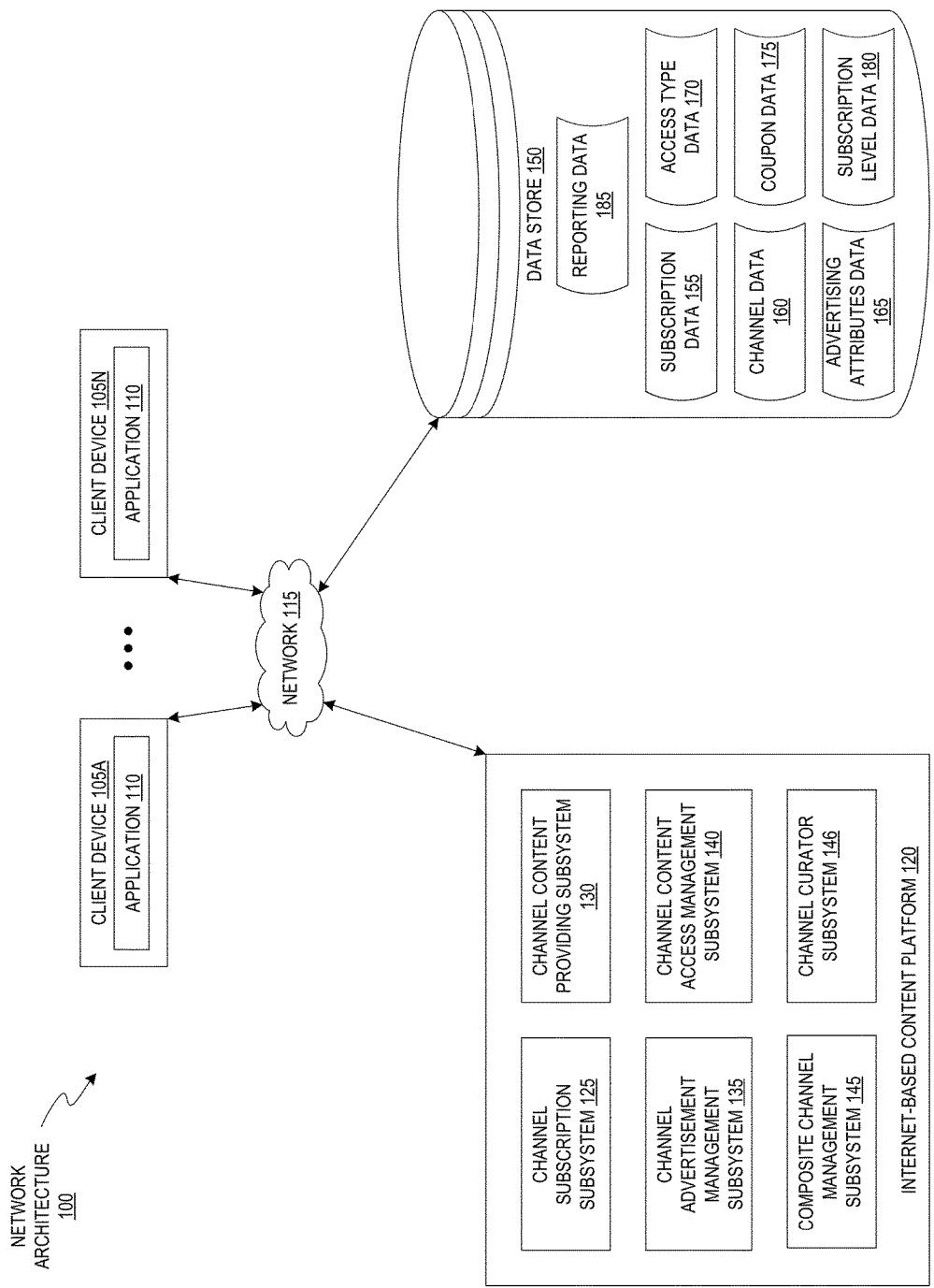
FIG. 1 illustrates an example network architecture in which embodiments of the present disclosure may operate, according to with one embodiment of the present disclosure.

The following disclosure sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely examples. Particular implementations may vary from these example details and still be contemplated to be within the scope of the present disclosure.

Implementations of the disclosure pertain to subscribing users to channels of an internet-based content platform. An internet-based content platform can be any platform that facilitates content uploading, sharing of content and feedback among various entities (e.g., individuals, organizations, etc.) and/or content curation. Entities are collectively referred to herein as users. A channel can be data content available from a common source or data content having a common topic or theme. A channel can be associated with a curator who can perform management actions on the channel. Management actions may include, for example, adding media items to the channel, removing media items from the channel, defining subscription requirements for the channel, defining presentation attributes for channel content, defining access attributes for channel content, etc. The channel content can be digital content uploaded to the internet-based content platform by a channel curator and/or digital content selected by a channel curator from the content available on the internet-based content platform. A channel curator can be a professional content provider (e.g., a professional content creator, a professional content distributor, a content rental service, a television (TV) service, etc.) or an amateur individual. Channel content can include professional content (e.g., movie clips, TV clips, music videos, educational videos) and/or amateur content (e.g., video blogging, short original videos, etc.). Users (including channel curators), can subscribe to one or more channels in which they are interested.

According to some aspects of the disclosure, a channel curator of one or more channels in an internet-based content platform is allowed to create and/or mange channels in an internet-based content platform. A channel curator may dynamically change the content of the paid channel, and the changed content can be immediately available to the subscribers. For example, a channel curator using the internet-based content platform can change the content of the paid channel in real time and the subscribers of the paid channel can be automatically presented with the changed content without any delay.

According to some aspects of the disclosure, the channel curator may provide paid channels that include both paid and free media items, using an internet-based content platform. A paid media item can be a media item that the user can access only after subscribing to a paid channel. A free media item can be a media item that the user can consume with or without subscribing to the paid channel. A user can select a paid channel of interest from a list of paid channels and may see that some media items of the selected paid channel are free and some media items are paid. If the user has not previously subscribed to the paid channel, the user may be allowed to view or play a free media item of the paid channel but the user may not be allowed to view or play a paid media item of the paid channel.

According to some aspects of the disclosure, the channel curator may define different subscription levels that may be used by users of the internet-based content platform to subscribe to a free or paid channel. The channel curator may associate the subscription levels with different subscription fees for different types of access to the channel. Alternatively or in addition, the channel curator may associate the subscription levels with different advertising attributes of the channel. Offering the subscription levels provides users with greater flexibility to select content and channel characteristics that better match their personal needs. For example, when a user selects a particular subscription level for a channel, the user can view media items of the channel with fewer advertisements or can unlock access for additional user devices (e.g., a mobile phone, a tablet, etc.).

In some implementations, the channel curator may define subscription levels that correspond to a certain type of access or certain advertising attributes, as described herein. When the user is a subscriber of a channel using a subscription level, the internet-based content platform can present the media items of the channel according to a subscription level (defined by the channel curator) that corresponds to a certain type of access or certain advertising attributes, as described herein. Similarly, when the user is not a subscriber of the channel, the internet-based content platform can present the media items of the channel according to a non-subscriber set of advertising attributes or a non-subscriber type of access.

Contemporary video hosting and sharing platforms typically allow a channel curator to either provide access to all content of a paid channel to a subscribed user, or limit or prevent access to all content of the paid channel to a non-subscribed user. Unlike these contemporary platforms, aspects of the internet-based content platform described herein permit the channel curator to grant full access to some content of a paid channel while restricting or limiting access to other content of the paid channel. A non-subscribed user can have full access to some movies of the paid channel, for example, while having limited or no access to other movies of the paid channel. The user can take an action, such as by subscribing to the paid channel, to unlock access to the other movies.

Further, contemporary media hosting or television platforms usually do not permit channel curators to define advertising attributes to control the presentation of advertisements to users who subscribe to a channel. Some music platforms can remove all advertisements when a user subscribes to the platform, but they typically do not permit channel curators to define different advertising attributes on a per channel basis. In contrast, aspects of the internet-based content platform described herein permit channel curators to define different advertising attributes for various channels.

Contemporary media hosting or television platforms typically do not permit channel curators to define different subscription levels that unlock different types of access on a per-channel basis. For example, while contemporary television platforms may permit channel curators to define different television packages, such platforms may not permit the channel curators to define different access types for different individual channels. Aspects of the present disclosure address these limitations by giving channel curators a significant level of flexibility on how to define different access types for different individual channels. Using the techniques described herein, channel curators can allow users to quickly gain access to desired content and to more easily select different subscription levels that best fit their needs for individual channels.

As discussed above, a channel can be data content available from a common source or data content having a common topic or theme. The data content can include one or more media items. Examples of a media items can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc., media items comprising at least one of a video item, an audio item, an image, a blog entry, a tweet, a social network post, an online publication, a software program, or an online video game. A media item may be consumed via a web browser and/or via a mobile device application. For brevity and simplicity, an online video (also hereinafter referred to as a video) is used as an example of a media item throughout this document. As used herein, "media," "media item," "online media item," "digital media," and a "digital media item" can include an electronic file that can be executed or loaded using software, firmware or hardware configured to present the digital media item to an entity. Content can also include live-streamed content and media items available on-demand.

The media items can be digital content chosen by a channel curator. The channel curator can be a user, a content provider, a media company, a broadband provider, a broadcaster, etc. The channel curator also can select various channel characteristics, such as whether the channel is free or paid. For paid channels, the curator can set or select a subscriber fee. The curator can also select different characteristics of the subscription, or define subscription levels that correspond to different types of access to the channels and corresponding subscriber fees. The internet-based content platform can include multiple channels that are created or curated by different channel curators.

A channel can be a paid channel that can be offered as a rental, purchase, or a paid subscription. A paid subscription involves a recurring payment for temporary access to an experience on the internet-based content platform. A rental involves a one-time payment for temporary access, and a purchase involves a one-time payment for unlimited access. Individual paid channels can be available for purchase "a la carte" (i.e., standalone) or as part of a package. Users can pick and choose the channels they want, unlike contemporary television and cable providers, where users obtain access to content as part of a large bundle.

As used herein, a channel can also refer to a composite channel. A composite channel is a channel that includes at least one component channel along with additional content. For example, a composite channel can include multiple component channels, or one or more component channels and at least one media item that is not part of any component channel. In one implementation, a component channel is not available for individual subscription; it is only available through a subscription to the composite channel.

FIG. 1 illustrates an example network architecture 100, according to one embodiment of the present disclosure. The network architecture 100 includes client devices 105A through 105N, a network 115, an internet-based content platform 120 and a data store 150. In one implementation, network 115 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) or LTE-Advanced network), routers, hubs, switches, server computers, and/or a combination thereof. In one implementation, the data store 150 may be may be a memory (e.g., random access memory), a cache, a drive (e.g., a hard drive), a flash drive, a database system, or another type of component or device capable of storing data. The data store 150 may also include multiple storage components (e.g., multiple drives or multiple databases) that may also span multiple computing devices (e.g., multiple server computers).

The client devices 105A through 105N may each include computing devices such as personal computers (PCs), laptops, mobile phones, smart phones, tablet computers, netbook computers, e-readers, personal digital assistants (PDA), or cellular phones etc. While only client devices 105A-105N are shown in FIG. 1, network architecture 100 may support a large number of concurrent sessions with many client devices 105.

Each client device includes at least one application 110 that allows an end user to subscribe to channels and view content and media items of the channels. For example, the application 110 may be a web browser that can present a list of subscribable channels to the end user. As a web browser, the application can also access, retrieve, present, and/or navigate content (e.g., web pages such as Hyper Text Markup Language (HTML) pages, digital media items, etc.) served by a web server. The application 110 may render, display, and/or present the list of subscribable channels and associated content to the end user. The application 110 may also provide an embedded media player (e.g., a Flash® player or an HTML5 player) that is embedded in a web page (e.g., a web page that may provide information about a product sold by an online merchant). In another example, the application 110 may be a standalone application (e.g., a mobile application or mobile app) that allows users to subscribe to channels and consume digital media items (e.g., digital videos, digital images, electronic books, etc.). The application 110 may be provided to the client devices 105A through 105N by the internet-based content platform 120. For example, the application 110 may be a browser that provides a media player that is embedded in a web page provided by the internet-based content platform 120. In another example, the application 110 may be an application that is downloaded from an application distribution platform, such as an "app store" (not shown in the figures).

Client devices 105A through 105N may also be used by channel curators to define and manage one or more channels of the internet-based content platform 120. In one embodiment, the application 110 may be an application that allows a channel curator to manage one or more channels of the internet-based content platform 120. For example, the internet-based content platform 120 may provide a web interface for channel curators to define and manage their channels. The application 110 may be a web browser that channel curators may use to access the web interface to allow the channel curators to manage their channels. In another example, application 110 may be an application (a mobile app) that communicates with the internet-based content platform 120 and allows channel curators to define and manage their channels in the internet-based content platform 120.

The internet-based content platform 120 may include one or more computing devices, such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components.

The internet-based content platform 120 may provide digital content (e.g., digital video, streaming video, images, digital music, streaming music, social media information, etc.) to one or more of the client device 105 and may allow users (e.g., end users and/or channel curators) to share content among multiple users. To provide digital content, for example, the internet-based content platform 120 may allow a user to subscribe to a paid or free channel. The internet-based content platform 120 may present different types of access or different subscriptions levels to the end user. The internet-based content platform 120 can also allow the end user to consume, upload, search for, curate, share, approve of ("like"), dislike, and/or comment on media items of various channels.

Although each of the internet-based content platform 120 and data store 150 are depicted in FIG. 1 as single, disparate components, these components may be implemented together in a single device or networked in various combinations of multiple different devices that operate together. Examples of devices may include, but are not limited to, servers, mainframe computers, networked computers, process-based devices, and similar type of systems and devices.

Internet-based content platform 120 can include a channel subscription subsystem 125 that creates and manages end user channel subscriptions, a channel content providing subsystem 130 that provides content to end users, a channel advertisement management subsystem 135 that manages advertisements presented to end users, a channel content access management subsystem 140 that manages different types of access for the end users, and a composite channel management subsystem 145 that manages composite channel subscriptions and access. The internet-based content platform 120 also includes a channel curator subsystem 146 that allows channel curators to define subscription levels, define advertising attributes, define types of access, create and manage channels, create and manage composite channels, and identify media items that are associated with channels and/or composite channels. Internet-based content platform 120 can include any one of the above subsystems or any combination of the above subsystems. The internet-based content platform 120 and its respective subsystems can interact with the client device 105, such as via the application 110, to communicate data between the internet-based content platform 120 and the end user. The subsystems can be implemented on a single server, a cluster of servers, a cloud, etc. The subsystems can also be implemented individually, each on a separate server, cluster of servers, a cloud, etc.

Data store 150 may include any combination of subscription data 155, channel data 160, advertising attribute data 165 and access type data 170. Subscription data 155 may include subscription data for users that have subscribed to channels identified in channel data 160 (e.g., registered users of an internet-based content platform). The subscription data 155 may include channels that a user has subscribed to, subscription levels for channels the user has subscribed to, selected types of access, selected advertising attributes, data content that the user has liked, topics the user is interested in, etc.

Channel data 160 may include identification information for various channels, such as an identifier of the channel (e.g., name), one or more identifiers (e.g., names) of content or media items associated with the channel, a list of media items in each channel, and/or whether individual media items in the channel are free or paid, etc. Channel data 160 can be used by the internet-based content platform 120 to generate a list of channels to present to users. The channel data 160 can be created based on input from a channel curator (e.g., subscriber fees for a channel, media item groups, etc.). For a composite channel, channel data 160 may also include identifiers of one or more component channels associated with the composite channel. A component channel may be a channel that is associated with (e.g., included as part of) a composite channel.

Advertising attribute data 165 may include various advertising schemes or models that can be implemented by the internet-based content platform when users consume content. Advertising attribute data 165 may include a subscriber set of advertising attributes (e.g., advertising attributes available to subscribers) and a non-subscriber set of advertising attributes (e.g., advertising attributes available to non-subscribers). Advertising attributes may be specified for individual channels or multiple channels (e.g., component channels of a composite channel, channels of the same curator, channels having the same theme, etc.). Advertising attribute data 165 may include instructions for presenting advertisements to users. For example an advertising attribute can be an instruction to display no advertisements to subscribers of a channel. Another advertising attribute can be an instruction to decrease a number of advertisements presented to the end user after the end user has consumed at least one media item of a channel. Other examples of subscriber advertising attributes can include a decrease of an aggregate length of time advertisements are presented to the end user after the end user has consumed at least one of media items of the channel, a presentation of advertisements of a specific category, a reduction of a number of advertisements from a category, a frequency for presenting an advertisement, a duration for presenting an advertisement, or an option to skip an advertisement presentation within the channel. Advertising attributes can affect any advertisement presented within the internet-based content platform including in-stream advertisements, overlay advertisements, banner advertisements, etc. The non-subscriber advertising attributes can include a full complement of advertisements. The non-subscriber advertising attributes can also include nonskippable advertisements, or advertisements that can be skipped after a longer viewing duration than for subscribers of the channel.

Access type data 170 can include different types of access that can be available to users when consuming content. Types of access can include a quality characteristic of the media item (e.g., video resolution, such as HD, 4k, 1080p, 1080i, 720p, etc.), offline access (e.g., caching content for offline consumption), an addition of subtitles to the media items, changing a language of the media items, access to content via additional user devices (e.g., a mobile phone, a table, etc.), blocking access to media items and/or channels (e.g., blocking all horror movies and videos). Types of access attributes may be specified for individual channels or multiple channels (e.g., component channels of a composite channel, channels of the same curator, channels having the same theme, etc.).

Coupon data 175 may include reductions in the subscription fees for different subscription levels and a period of time that the reductions are valid. For example, the coupon data may include data indicating that for a particular subscription level, the price of the subscription level may be reduced by $1.00 or by 20% for the next month.

The subscription level data 180 includes data for the different subscription levels for the channels in the internet-based content platform 120. The subscription level data 180 includes data indicative of different subscription levels, the channels that the subscription levels are associated with, subscriber advertising attributes associated with the subscription levels, and types of access associated with the subscription level. For example, the subscription level data 180 may indicate that a subscription level is associated with a particular channel, the subscription price, billing period, and country for the subscription level, an advertising attribute indicating that no ads should be presented to a user, and a type of access that allows subtitles to be presented to the user.

In some embodiments, data store 150 is deployed across one or more datacenters. A datacenter is a facility used to house a large number of storage devices. Data in data store 150 may be replicated across the multiple datacenters in order to provide reliability, availability, and scalability (RAS) features and/or to allow fast load times for the presentation of content on the content hosting website. The manner of replication of data may be selected by a user, may be selected based on one or more replication algorithms, etc.

In embodiments of the disclosure, the internet-based content platform 120 notifies end users of the types of information that are stored in data store 150, and provides the end users the opportunity to choose not to have such information collected, analyzed, and/or shared.

During operation of internet-based content platform 120, a user accesses the internet-based content platform 120 via client/user device 105 over network 115. When a user navigates the internet-based content platform 120, the internet-based content platform 120 can present one or more lists of subscribable channels. The user can navigate the internet-based content platform 120 to discover content and channels through keyword searching, browsing recommended channels, identifying other users' activity, such as by viewing channels or media items shared by others, or a combination thereof.

Once the end user identifies content they would like to consume, the end user can take different actions depending on access restrictions placed on the content. The end user can subscribe (e.g., for free or by paying a subscriber fee) to a channel to gain access to content. The subscriber fee can be a one-time fee, or can be a recurring fee. In some implementations, the subscriber fee may vary depending on advertising attributes or a subscription level for specific type(s) of content access.

To subscribe to a channel, the user can initiate a request to subscribe to the channel, such as by pressing a 'subscribe' button presented by application 110. The channel subscription subsystem 125 can receive the request of the end user to subscribe to the channel (e.g., paid or free). The channel subscription subsystem 125 can also request information from the end user, such as personal information (e.g., access credentials) and payment information of the end user. Once the channel subscription subsystem 125 receives the information from the end user, it can create a subscription to the channel for the end user based on the end user information. After creating the subscription for the end user, the channel subscription subsystem 125 can record the user subscription as subscription data 155 of data store 150. In one implementation, when the user subscription is recorded, the channel content providing subsystem 130 allows the user to immediately (e.g., in real time) consume media items of the channel. The user can also immediately (e.g., in real time) view his or her subscriptions from a user home GUI of the internet-based content platform 120.

To access content of a channel, the user can submit an access request to the internet-based content platform 120, such as by activating a play button within the application 110. The channel content providing subsystem 130 can provide access to the content of the channel to the end user according to the user subscription. The channel content providing subsystem 130 can check subscription data 155 for a user subscription and can provide access to content accordingly. For example, channel content providing subsystem 130 may receive input identifying a media item that an end user wants to consume. The channel content providing subsystem 130 may determine whether the media item is a free media item or a paid media item. If the media item is free media item, the channel content providing subsystem 130 may provide the user with access to the free media item. If the media item is a paid media item, the channel content providing subsystem 130 may request subscription information from the end user and may verify the subscription information (e.g., verify that the user is subscribed to the channel) before providing the user with access to the paid media item. In one implementation, the channel content providing subsystem 130 provides the end user access to the content of the channel via the same client device 105, application 110 and/or user interface that the end user used to make the request to subscribe to the channel.

In one implementation, the channel advertisement management subsystem 135 manages advertisements provided in conjunction with channels of the internet-based content platform 120. The channel advertisement management subsystem 135 can provide advertisements to the user according to the user subscription level. The channel advertisement management subsystem 135 can present advertisements to end users while the end users navigate and consume content within the internet-based content platform 120. The channel advertisement management subsystem 135 may also receive a request from a user to consume a media item in a paid channel. The channel advertisement management subsystem 135 may determine whether a user is subscripted to the paid channel. If the user is not subscribed, the channel advertisement management subsystem 135 may provide the user with access to the media item based on a non-subscriber set of advertising attributes. If the user is subscribed, the channel advertisement management subsystem 135 may provide the user with access to the media item based on a subscriber set of advertising attributes. For example, a subscriber set of advertising attributes may indicate that fewer or no commercials should be presented to a user because the user is subscribed to the paid channel and a non-subscriber set of advertising attributes may indicate that more commercials should be presented to the user because the user is not subscribed to the paid channel.

In another implementation, the channel content access management subsystem 140 manages different types of access to media items of a channel. The content access management subsystem 140 may receive a selection of a subscription level from an end user. The content access management subsystem 140 may store the selected subscription level for the user and may provide access to media items based on the selected subscription level. For example, a user may purchase a subscription that has a subscription level which allows offline access of media items. The content access management subsystem 140 may store data indicating that a user has a subscription level that allows offline access of media items. When the user requests offline access of a media item at a later time, the content access management subsystem 140 may grant the user offline access to the media items based on the stored data.

In one implementation, network architecture 100 can include a social connection platform (not shown) that may be one or more computing devices (e.g., servers), data stores, networks, software components, and/or hardware components that may be used to allow users to connect to, share information, and/or interact with each other. The social connection platform may present to a user a listing (e.g., feed, stream, wall, etc.) of objects (such as posts, content items (e.g., video, images, audio, etc.), status updates, favorability indications, tags, messages, and so on) generated by other users of the social network. The social connection platform may also include a content sharing aspect that allows users to upload, view, tag, and share content, such as text content, video content, image content, audio content, and so on. Other users of the social connection platform may comment on the shared content, discover new content, locate updates, share content, and otherwise interact with the provided content. In one implementation, the internet-based content platform may be integrated with the social connection platform. For example, the social connection platform may use the internet-based content platform 120 to allow users to upload and/or share content. In another embodiment, the social connection platform may be separate from the internet-based content platform 120.

In one implementation, network architecture 100 can include multiple integrated platforms that can communicate with each other and permit users to discover and consume content across multiple platforms. For example, network architecture 100 can include an email platform (not shown) that may be hosted by one or more computing devices (e.g., servers), data stores, networks, software components, and/or hardware components that may be used to allow users to send and/or receive electronic-mail (emails) to each other. For example, a first user may use the email platform to send an email to a second user regarding a channel or media item of interest. The users may also attach files (e.g., video files, image files, text files, etc.) to the email messages. In one implementation, the email platform, and/or the social connection platform may also include chat functionality (e.g., a chat platform) to allow users to chat (e.g., to exchange instant messages) with each other about channels and media items of interest. In another implementation, network architecture 100 includes a search platform that may be hosted by one or more computing devices, data stores, networks, software components, and/or hardware components that may be used to allow users to search for information and/or data. For example, the search platform may allow a user to search the Internet and/or other networks for channels, media items, topics, movies, videos, articles, blogs, websites, webpages, images, videos, etc. The search platform may also include a search engine.

FIGS. 2-15 illustrate example graphical user interfaces (GUIs) according to aspects of the present disclosure. The example GUIs can be provided by the channel curator subsystem 146 and may be presented by and/or displayed within a web browser when the channel curator accesses the internet-based content platform via the web browser. In another embodiment, the example GUIs may be an interface presented by a media viewer (e.g., an app, an application, a program, a software module/component, etc., that may be used to define channels, manage channels, subscribe to channels and view, play, and/or consume media items of the channels). Some example GUIs include control elements in the form of a button (e.g., a button for subscribing to a channel). However, it should be noted that various other user interface elements can be used for selection by a channel curator such as a check box, a link, or any other user interface elements.

As shown, some example GUIs may contain a search tool (e.g., a search bar to search for a channel or media item of interest), an upload tool (e.g., to upload a new media item to an internet-based content platform), a menu (e.g., to navigate to different GUIs of the internet-based content platform), a user identifier, a settings tool (e.g., to configure settings of GUIs of the internet-based content platform), and a navigation tool for navigating to other platforms (e.g., an email platform, a social platform, a storage platform, an image platform, a calendar platform, among others).

Figure 2:
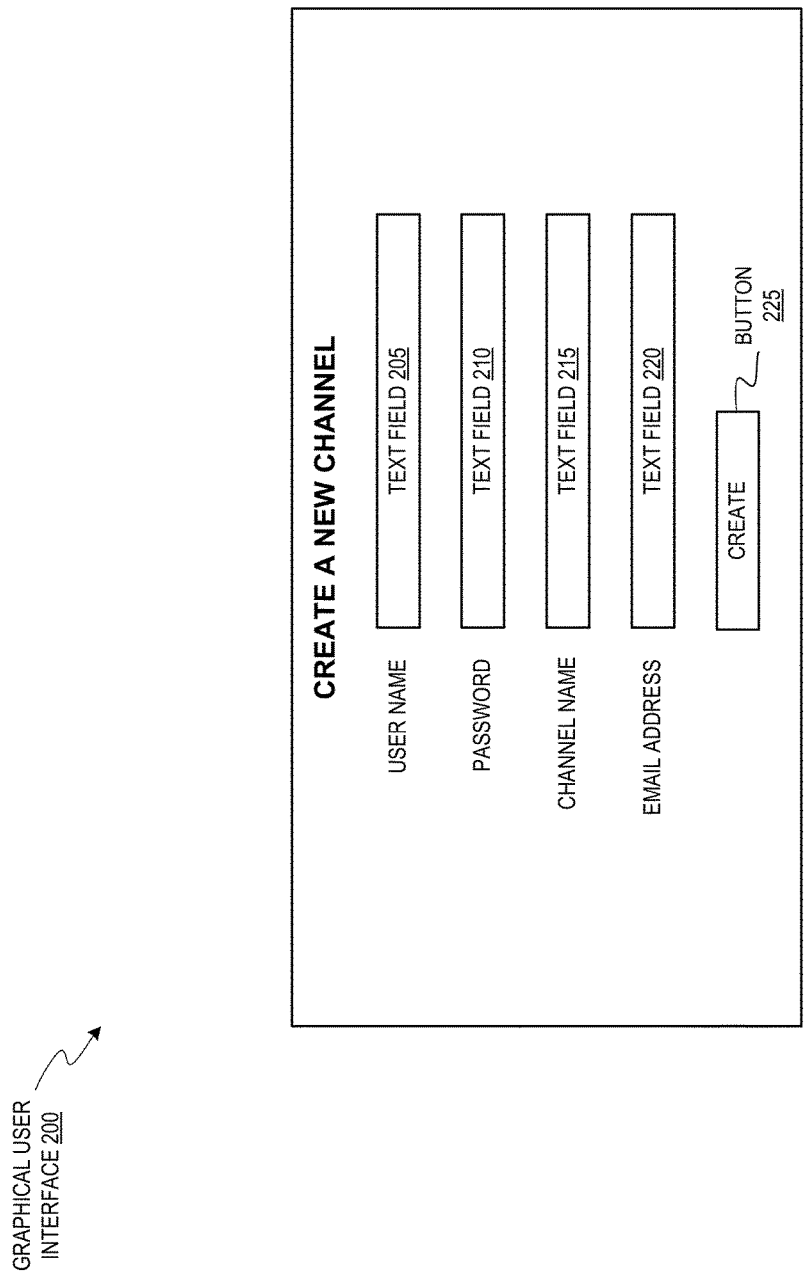
FIG. 2 illustrates an example GUI for creating a channel in an internet-based content platform, according to one embodiment of the present disclosure.

FIG. 2 illustrates an example GUI 200 for creating a channel in an internet-based content platform (e.g., internet-based content platform 120 illustrated in FIG. 1), according to one embodiment of the present disclosure. The GUI 200 includes text fields 205, 210, 215, and 220, and button 225.

The text field 205 may allow a channel curator to indicate a username that the channel curator may use to log into the internet-based content platform. The text field 210 may allow the channel curator to indicate a password that the channel curator may use (in conjunction with the user name) to log into the internet-based content platform. The text field 215 may allow the channel curator to indicate a name for the new channel. In one embodiment, the channel name provided by the channel curator may be different from the user name provided by the channel curator. In another embodiment, the channel name may be optional. For example, the internet-based content platform may use the user name (e.g., the input received from text field 205) as the name of the new channel and the text field 215 may not be included in the GUI 200. The text field 220 may allow a channel curator to indicate an email address that may be used to contact the channel curator.

The button 225 may allow a channel curator to request that the new channel be created using the information provided in one or more of the text fields 205, 210, 215, and 220. In one embodiment the internet-based content platform may check one or more of the text fields 205, 210, 215, and 220 before the channel curator is allowed to create the new channel. For example, the internet-based content platform may check that the channel curator has provided a user name, a password, and a channel name before creating the new channel. If the user name provided by the channel curator already exists, the internet-based content platform may determine whether the password provided by the channel curator matches the password associated with the user name. If the password is incorrect, an error message (e.g., text, images, buttons, and/or other user interface components) may be presented to the channel curator. If the user name provided by the channel curator does not exist, the internet-based content platform may create a new account for the channel curator using the user name and password (received via text fields 205 and 210). In another example, the internet-based content platform may check whether the channel name provided by the channel curator already belongs to another channel in the internet-based content platform.

In other embodiments, additional text fields, radio buttons, drop down menus, check boxes, and/or other user interface components (not shown in FIG. 2) may be provided in the GUI 200 to obtain additional information from the channel curator. For example, the GUI may include additional text fields to allow the channel curator to voluntarily provide additional contact information (e.g., a phone number, a mailing address), and/or other information (e.g., channel curator may optionally provide their birthday, etc.).

Figure 3:
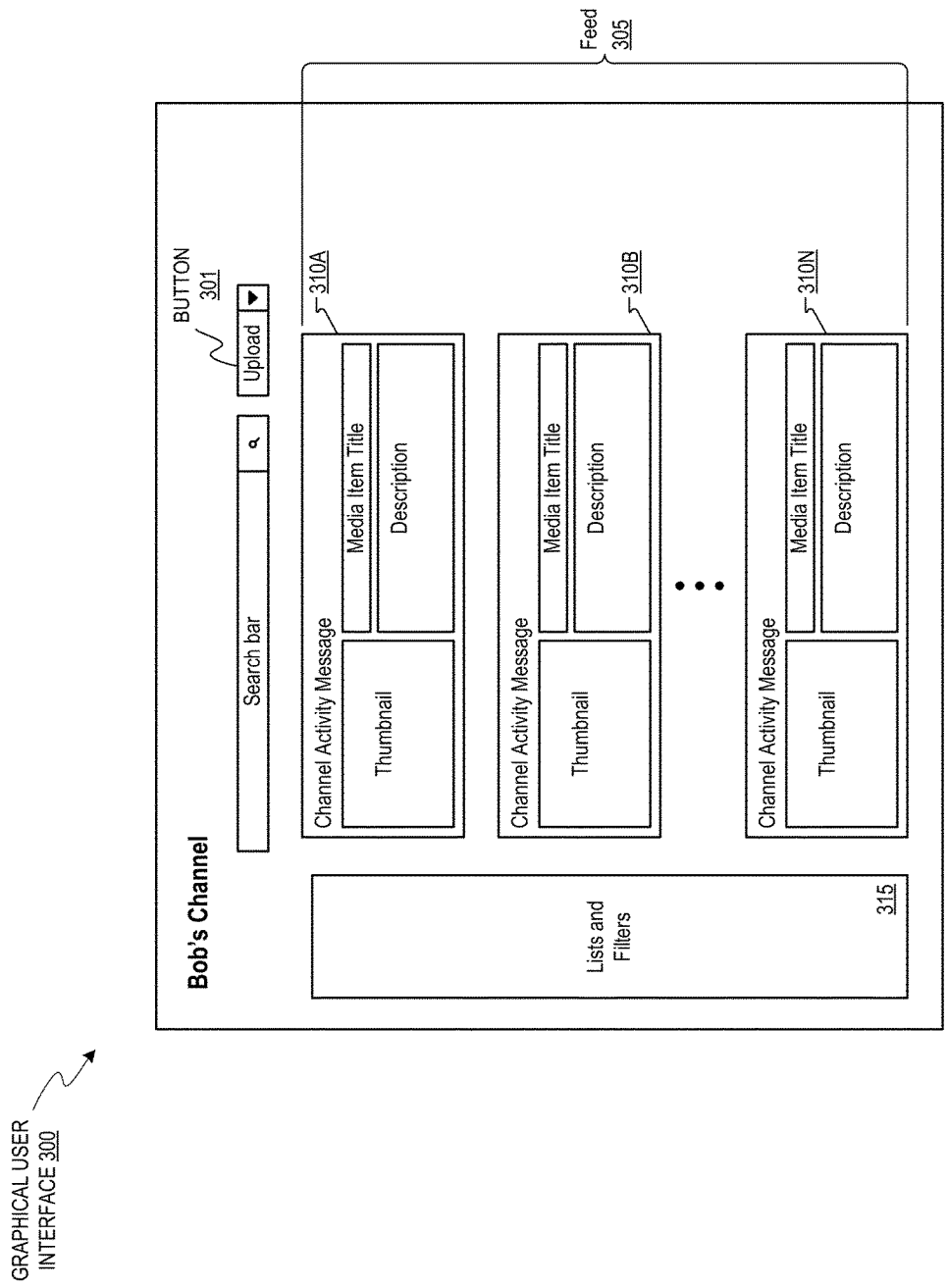
FIG. 3 illustrates an example home GUI that may be presented to a channel curator after the channel curator creates a new channel and/or after the channel curator logs into an internet-based content platform, according to one embodiment of the present disclosure.

FIG. 3 illustrates an example home GUI 300 that may be presented to a channel curator after the channel curator creates a new channel and/or after the channel curator logs into an internet-based content platform, according to one embodiment of the present disclosure. The GUI 300 includes a search bar, button 301, lists and filters 315, and a feed 305. As indicated in FIG. 3, the name of the channel created by the channel curator is "Bob's Channel." The GUI 300 illustrates that a user of the internet-based content platform can be a curator of some channels, as well as an end user of other channels.

The button 301 allows a channel curator to upload media items to the channel (e.g., to Bob's Channel). When the channel curator activates (e.g., selects, clicks, etc.) the button 301, the GUI 400 (illustrated in FIG. 4) may be presented to the channel curator. The GUI 400 may allow the channel curator to select and upload media items to the channel (e.g., to Bob's Channel), as discussed below in conjunction with FIG. 4.

The feed 305 can include information of activities associated with channels to which the channel curator is subscribed. When the channel curator subscribes to a channel (e.g., paid and free) or connects with a social contact, the internet-based content platform may provide the channel curator with new media items (e.g., media items added to a channel that the channel curator is subscribed to, media items that have been commented on or approved by a social contact of the channel curator, etc.) to consume and/or provide the channel curator with access to media items. For example, media items from subscribed channels (e.g., paid and free) may be displayed on the user feed 1505. It should be understood that any type of activity or feed information from any source or other entity may be shown in the feed 305. For example, an image (e.g., a JPEG) may be shown in the feed 305, digital music (e.g., an MP3) may be played in the feed 305, social media information (e.g., a tweet, a like, etc.) may be shown in the feed 305, blog information (e.g., a blog post, etc.) may be shown in the feed 305, etc.

The information of activities of others (e.g., other channel curators, social contacts, celebrities, etc.) can be presented as one or more feed items 310A-310N. The feed items 310A-310N can include an activity message, a thumbnail or frame of a media item, a media item title, and a description of the media item. In one embodiment, the feed items 310A-310N can include information about the most recent activities associated with each channel (e.g., content uploaded to the channel, etc.), as well as a mechanism for the channel curator to perform an action for that activity (e.g., providing a frame or thumbnail of the content uploaded to the channel that serves as a link to the content). For example, feed item 310A may include an activity message that "Channel A uploaded a video," as well as a thumbnail or frame of the video which the channel curator can activate to view the new video. When other channel curators add and/or remove media items from their channels, the feed 305 may be updated in real-time (e.g., new feed items may be added and existing feed items may be removed). When a channel curator is unsubscribed from a channel, the internet-based content platform can also prevent media items of the channel from appearing in the feed 305.

The lists and filters 315 can be a list of one or more channels (free or paid) that may be of interest to the channel curator. The lists and filters 315 can also include a guide that helps the channel curator to discover content that may be of interest. For example, lists and filters 315 can include a section for what to watch, what media items are popular on the internet-based content platform, what media items social contacts of the channel curator have been consuming, etc. The lists and filters 315 can also include links to help the channel curator to see their watch history and what media items they have marked for later consumption.

The lists and filters 315 can also include a subscriptions section that includes a list of one or more channels that the channel curator is currently subscribed to. In one embodiment, the subscriptions section may include a list of all channels, both free and paid, to which the channel curator is subscribed. In another embodiment, the subscriptions section may include a subset of channels to which the channel curator is subscribed. The subscriptions section may also present a predefined number of channels (e.g., five channels), the channels that the channel curator accesses most frequently, the channels that the channel curator has accessed most recently, the channels that the channel curator has most recently subscribed to, etc. The subscriptions section can further include the channel names (e.g., "Channel A") to present to the channel curator that the channel curator is currently subscribed to channel. When a channel curator subscribes to a channel, the channel can be added to the subscriptions section. The channel curator can then select the channel from the subscriptions section to consume (e.g., playback or listen to) media items of the channel. The channel curator can select a media item of the channel and can immediately consume the media item.

In one implementation, the lists and filters 315 can include one or more buttons (not shown). The buttons may allow the channel curator to view a history of the media items (e.g., a list of the last ten, twenty, fifty, or hundred media items) that the channel curator has consumed (e.g., viewed or played). A button may allow a channel curator to view different playlists of media items that the channel curator has previously created and/or obtained. A playlist may be a list and/or an order of different media items that can be viewed in sequential or shuffled order without interaction from the channel curator. A media viewer (e.g., a media viewer application and/or a web browser) may play the media items on a playlist in the order in which the media items are listed on the playlist. A channel curator may also transition between media items on a play list. For example, a channel curator may play the next media item on the playlist or may select a particular media item in the playlist.

In a further implementation, when the channel curator is unsubscribed from a channel, the channel is removed from the subscriptions section. The channel curator may be unsubscribed from a channel if the channel curator provides input indicating that the channel curator wants to unsubscribe from the recommended channel. For example, the channel curator may activate an "Unsubscribe" button. For paid channels, the channel curator may be unsubscribed from a channel if the channel curator's subscription runs out. For example, if the subscription was for a term of one month and the channel curator does not pay for an additional month, the channel curator may be unsubscribed from the channel. Similarly, when a channel curator gains access to a channel through a promotion or trial period, the channel curator may be unsubscribed from the channel when the promotion or trial period concludes.

Figure 4:
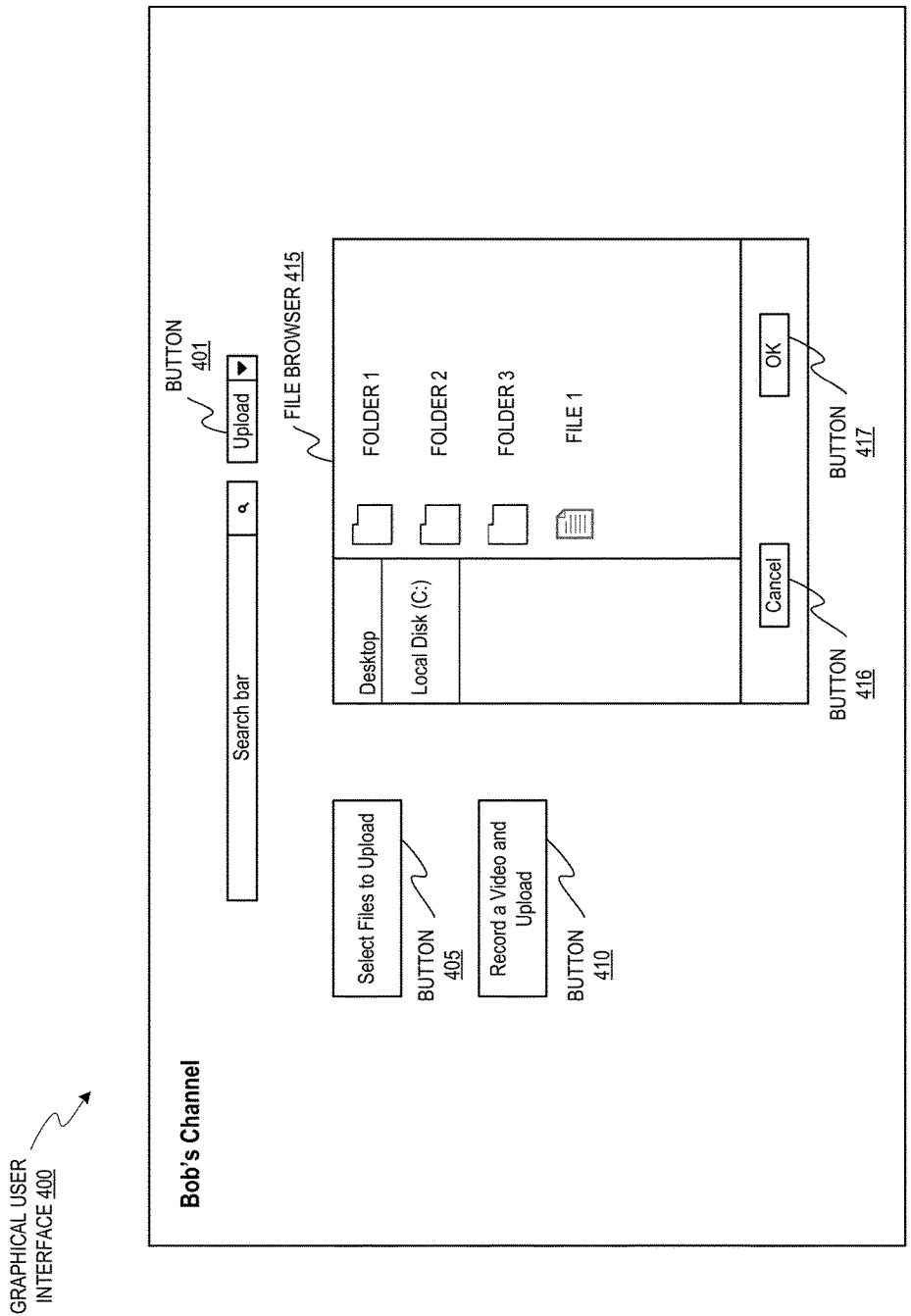
FIG. 4 illustrates a GUI for uploading one or more media items to an internet-based content platform, according to one embodiment of the present disclosure.

FIG. 4 illustrates a GUI 400 for uploading one or more media items to an internet-based content platform, according to one embodiment of the present disclosure. The GUI 400 includes button 401, button 405, button 410, and file browser 415. As discussed above, the button 401 allows a channel curator to indicate that the channel curator wishes to upload media items to the channel curator's channel (e.g., to Bob's Channel). When the channel curator activates (e.g., selects, clicks, etc.) the button 401, the GUI 400 may be presented to the channel curator.

The button 410 allows the channel curator to indicate (e.g., provide input indicating) that the channel curator wishes to record a video using a camera device (e.g., a digital camera, a web camera, a digital recorder, etc.). The internet-based content platform may provide the channel curator with a second GUI (not shown in the figures) that allows the channel curator to capture and/or record the video (e.g., using a web camera). In one embodiment, once the video is recorded, the channel curator may indicate that the video should be uploaded to the internet-based content platform (e.g., by selecting, clicking, and/or activate a button on a second GUI). The second GUI may also include other user interface elements (e.g., text fields, radio buttons, drop down menus, file menus, etc.) that allow a channel curator to provide additional data, such as a name for the video (e.g., media item), information about the video (e.g., the subject matter of the video, comments, date and time the video was captured), etc.

The button 405 allows the channel curator to select one or more media items to upload to the internet-based content platform. When the channel curator activates (e.g., selects and/or clicks the) button 405, the file browser 415 may be presented to the channel curator. The file browser 415 may allow the channel curator to navigate to different data stores (e.g., different hard drives, network drives, flash memory drives, etc.) and select one or more media items. The channel curator may provide input selecting one or more media items from the different data stores. After the channel curator selects one or more media items, the channel curator may activate the button 417 to indicate that the channel curator wants to upload the selected one or more media items to the channel "Bob's Channel" in the internet-based content platform. The channel curator may activate (e.g., click and/or select) button 416 to cancel the upload of the selected one or more media items to the channel "Bob's Channel." In one embodiment, a channel curator may use a separate GUI (not shown in the figures) to identify media items that are already part of the internet-based sharing platform, and may include those mediate items in a channel and/or composite channel. For example a channel curator may identify a media item is already associated with another channel, and associate the media item with a different channel.

In one embodiment, a channel may initially include free media items only. A paid media item may be included in the channel at a later time (e.g., using GUI 400). In another embodiment, a channel may initially include paid media items only. A free media item may be included in the channel at a later time (e.g., using GUI 400).

In one embodiment, the file browser 415 may be overlaid over the GUI 400. For example, file browser 415 may be positioned over the user interface elements in the GUI 400 (e.g. buttons 401, 410, 405, etc.). At least some portions, if not all of the user interface elements (e.g., buttons 401, 405, and 410) may remain visible in the GUI 400.

Figure 5A:
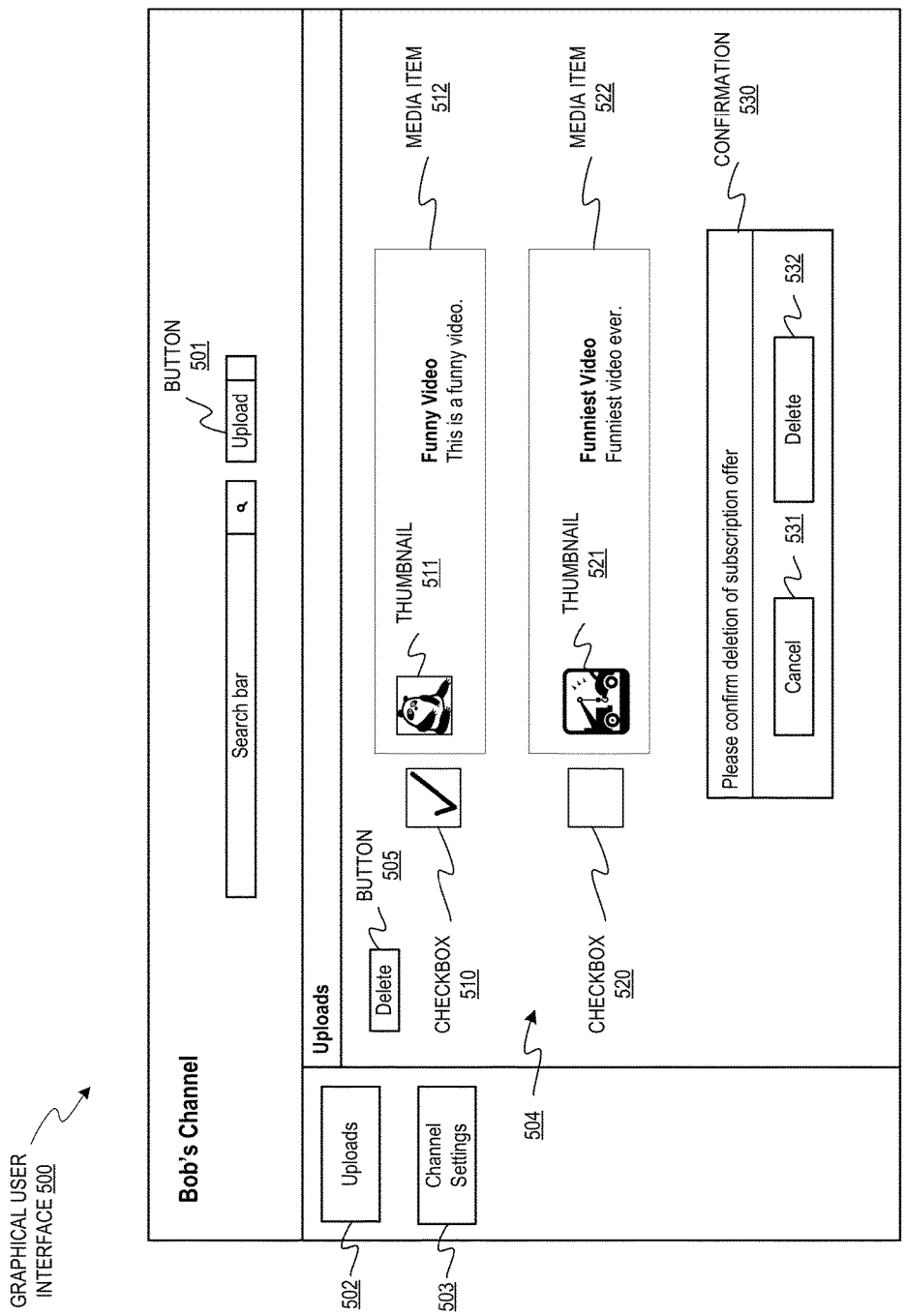
FIG. 5A illustrates a GUI for viewing and/or managing media items in a channel in an internet-based content platform, according to one embodiment of the present disclosure.

FIG. 5A illustrates a GUI 500 for viewing and/or managing media items in a channel in an internet-based content platform, according to one embodiment of the present disclosure. The GUI 500 includes button 501, button 502, button 503, button 505, checkbox 510, checkbox 520, media item 512 and media item 522. As discussed above, the button 501 may allow a channel curator to upload one or more media items to the internet-based content platform. For example, the GUI 400 illustrated in FIG. 4 (and which allows a channel curator to upload media items) may be presented to the channel curator when the channel curator activates button 501. The channel settings button may allow the channel curator to view and/or manage the settings for the channel "Bob's Channel" (as discussed below in conjunction with FIGS. 6-15)

The button 502 allows the channel curator to view and/or manage the media items in the channel (e.g., in Bob's Channel). When the channel curator activates button 502, an Uploads section 504 is presented to the channel curator in the GUI 500. The Uploads section 504 includes media item 512 and media item 522, indicating that the media items 512 and media items 522 are associated with Bob's channel (e.g., the media items are part of Bob's Channel or are included in Bob's Channel). The media item 512 includes a thumbnail 511. The thumbnail 511 may be text, a thumbnail, an image, a picture, an icon, and/or a preview of the media item 512 (e.g., may be an image and/or a frame from the media item 512). The media item 512 also includes the title of the media item (e.g., "Funny Video") and a description of the media item (e.g., "This is a funny video"). The media item 522 includes a thumbnail 521. The thumbnail 521 may be an image, a picture, an icon, and/or a preview of the media item 522 (e.g., may be an image and/or a frame from the media item 522). The media item 522 also includes the title of the media item (e.g., "Funniest Video") and a description of the media item (e.g., "Funniest video ever"). Media item 512 is associated with checkbox 510 and media item 522 is associated with checkbox 520. As illustrated, in FIG. 5A, the checkbox 510 is checked (e.g., activated). This indicates that the channel curator has provided input (e.g., a selection, a click, etc.) selecting media item 512. In one embodiment, there may be numerous media items in the Uploads section 504 and the channel curator may select one or more of the media items using checkboxes associated with the media items.

The button 505 may allow a channel curator to delete one or more media items from the channel Bob's Channel. For example, because checkbox 510 is checked, media item 512 will be deleted from the channel Bob's Channel when the channel curator activates (e.g., clicks, selects, etc.) the button 505. In one embodiment, deleting the media item may disassociate the media item with the channel Bob's Channel and the media item may remain in a data store in the internet-based content platform (e.g., because the media item is associated with a different channel). In one embodiment, a confirmation 530 may be presented to the channel curator when the channel curator. The confirmation 530 includes button 531 and 532. The button 531 may allow a channel curator to cancel the deletion of one or more media items. The button 532 may allow the channel curator to confirm the deletion of one or more media items. When the channel curator activates button 532, the internet-based content platform may delete (e.g., disassociate) the media items selected by the channel curator (e.g., selected using checkboxes 510 and 520) from Bob's Channel.

In one embodiment, the confirmation 530 may be overlaid over the GUI 500. For example, confirmation 530 may be positioned over the user interface elements in the GUI 500 (e.g. buttons 501, 502, 503, media item 512, checkbox 520, etc.). At least one portions, if not all of the user interface elements may remain visible in the GUI 500.

Figure 5B:
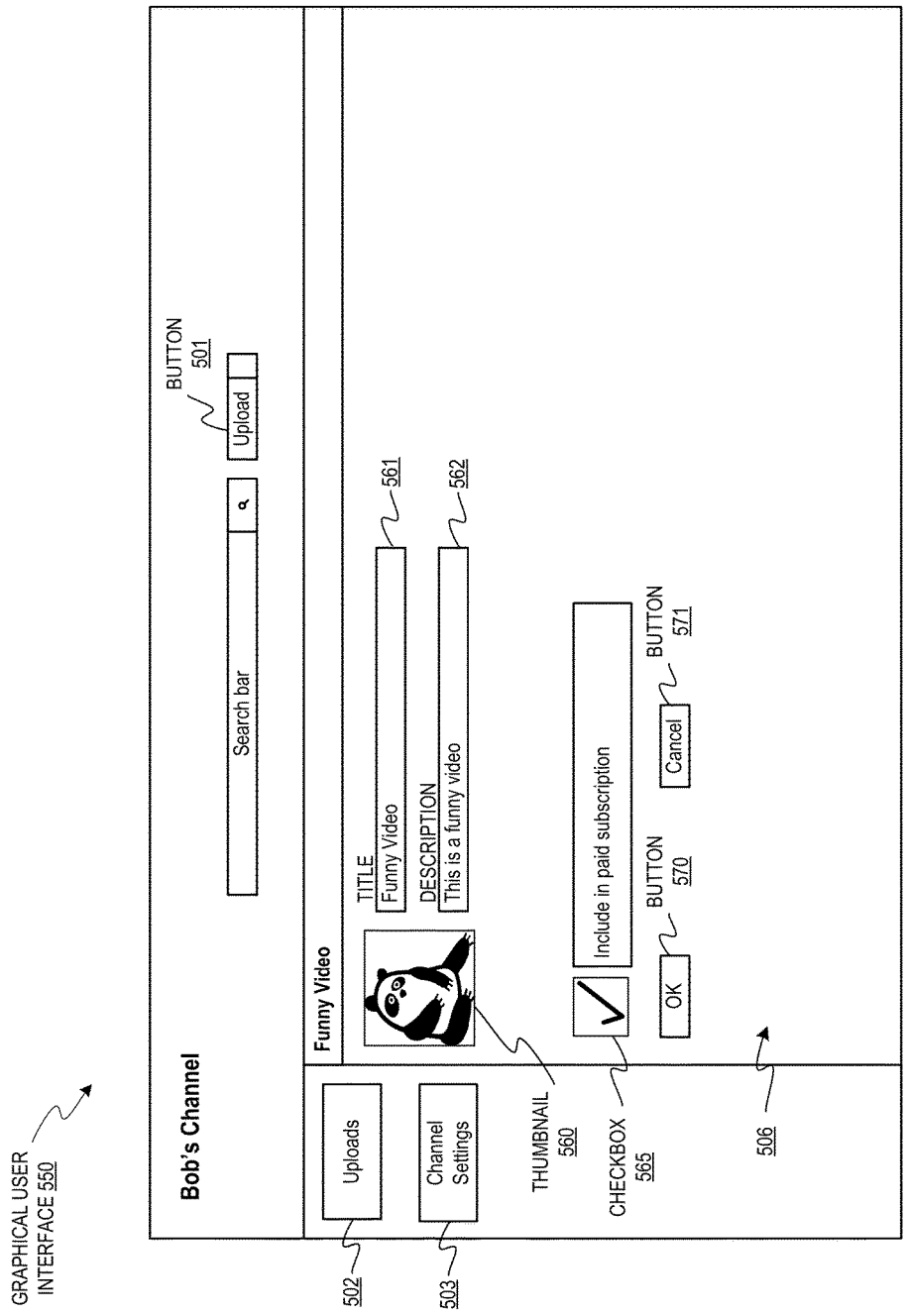
FIG. 5B illustrates a GUI for viewing and/or managing a media channel in an internet-based content platform, according to one embodiment of the present disclosure.

FIG. 5B illustrates a GUI 500 for viewing and/or managing a media item in a channel of an internet-based content platform. The GUI 550 includes button 501, button 502, button 503, button 570, button 571, checkbox 565, thumbnail 560, text field 561, and text field 562. As discussed above, the button 501 may allow a channel curator to upload one or more media items to the internet-based content platform. For example, the GUI 400 illustrated in FIG. 4 (and which allows a channel curator to upload media items) may be presented to the channel curator when the channel curator activates button 501. The button 503 may allow the channel curator to view and/or manage the settings for the channel "Bob's Channel" (as discussed below in conjunction with FIGS. 6-15). The button 502 may allow a channel curator to view and/or manage media items in the channel (e.g., in Bob's Channel) as discussed above in conjunction with FIG. 5A.

In one embodiment, the GUI 550 may be displayed to a channel curator after the channel curator selects a media item. For example, referring back to FIG. 5A, the media item 512 may be a button and/or a link. When the channel curator activates (e.g., clicks and/or selects) the media item 512, the GUI 550 may be presented to the channel curator. The GUI 550 may allow a channel curator to manage the media item 512.

The GUI 550 includes a media item section 506 that may allow a channel curator to view and/or manage the media item 512. The media item section 506 includes text field 561, 562, button 570, button 571, and checkbox 565. As illustrated in FIG. 5B, the thumbnail 560 may be text, a thumbnail, an image, a picture, an icon, and/or a preview of the media item 512. The text field 561 may allow a channel curator to indicate (e.g., provide input indicating) a new name for the media item. The text field 562 may allow the channel curator to indicate a new description for the media item. The checkbox 565 allows a channel curator to provide input indicating that whether the media item is a paid media item (e.g., an item that is consumable if the end user has a subscription to the paid channel) or a free media item (e.g., an item that is consumable regardless of whether the end user has a subscription to the paid channel). If checkbox 565 is checked, this indicates that end users should have a paid subscription to the channel Bob's Channel in order to consume (e.g., view) the media item titled "Funny Video" (e.g., the media item is a paid media item). If checkbox 565 is not checked, this indicates that users can consume (e.g., view) the media item titled "Funny Video" (e.g., the media item is a paid media item) regardless of whether they have a subscription (e.g., the media item is a free media item).

The button 570 allows the channel curator to save the changes to the media item. For example, after the channel curator changes the title (using text field 561) and/or indicates that the media item is a free media item, the channel curator may activate button 570 to save the changes to the media item (e.g., the change to the title and the change to free media item). The button 571 allows the channel curator to cancel any changes to the media item. For example, the channel curator may change the title of the media item and may decide to keep the original title. The channel curator may activate the button 571 to cancel the changes to the title.

Figure 6:
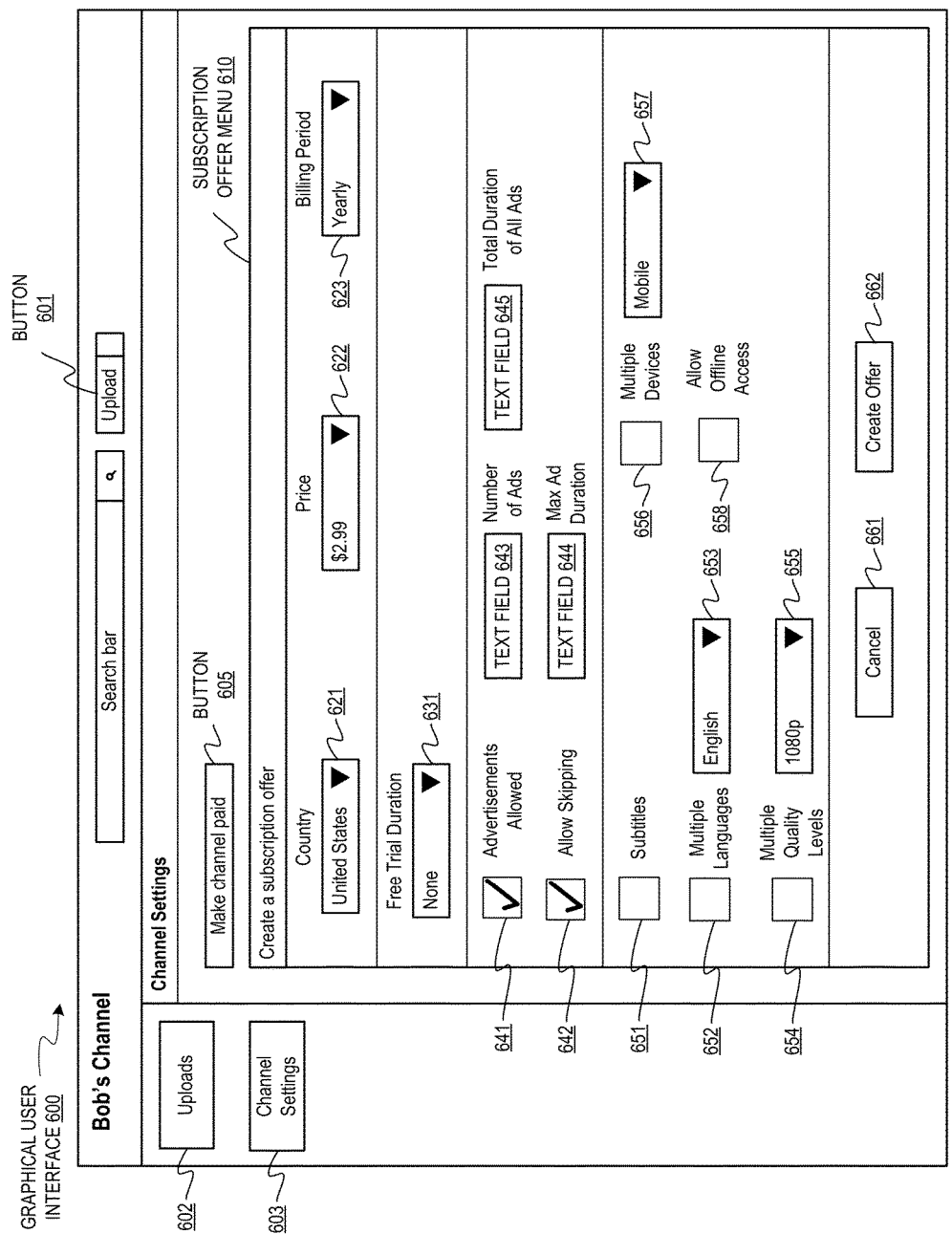
FIG. 6 illustrates a graphical user interface for creating a subscription level for a channel in an internet-based content platform, according to one embodiment of the present disclosure.

FIG. 6 illustrates a graphical user interface 600 for creating a subscription level for a channel in an internet-based content platform, according to one embodiment of the present disclosure. The GUI 600 includes button 601, button 602, button 603, button 605, and subscription offer menu 610. As discussed above, the button 601 may allow a channel curator to upload one or more media items to the internet-based content platform. For example, the GUI 400 illustrated in FIG. 4 (and which allows a channel curator to upload media items) may be presented to the channel curator when the channel curator activates button 601. The button 602 may allow a channel curator to view and/or manage media items in the channel (e.g., in Bob's Channel) as discussed above in conjunction with FIG. 5A.

The button 603 may allow the channel curator to view and/or manage the settings for the channel "Bob's Channel." For example, when the channel curator activates and/or selects button 603, the Channel Settings portion is presented to the channel curator in the GUI 600. The channel settings portion includes button 605. In one embodiment, the button 605 may be presented to the channel curator when the channel "Bob's Channel" is a free channel (e.g., a channel that an end user may subscribe to without paying a subscription fee). The channel curator may activate button 605 in order to convert and/or change the channel "Bob's Channel" into a paid channel (e.g., a channel that user may subscribe to only after paying a subscription fee). When the channel curator activates button 605, the subscription offer menu 610 is presented to the channel curator.

The subscription offer menu 610 allows the channel curator to create a subscription level for the channel Bob' Channel. The subscription level may also be referred to as an offer and/or a subscription offer. The subscription offer menu 610 includes drop down menus 621, 622, and 623. Drop down menu 621 allows the channel curator to select a geographical location where the subscription level (e.g., the subscription offer) is valid. For example, a subscription level may be offered to end users in certain graphical locations (E.g., only to end users in the United States, only to end users in China, etc.). As shown in FIG. 6, the geographical location "United States" has been selected by the channel curator. The drop down menu 621 may include one or more geographical locations (e.g., continents, countries, counties, cities, etc.) that the channel curator may select. The drop down menu 622 includes a list of subscription fees (e.g., prices). The channel curator may select a subscription fee (e.g., a price) for the subscription level. In one embodiment, the drop down menu 622 may be replaced with a text box to allow a channel curator to enter a subscription fee (e.g., allow a channel curator to type a value). In other embodiments, any currency (e.g., dollar, pound, euro, yen, etc.) may be used for the subscription fee. Drop down menu 623 allows the channel curator to select a billing period for the subscription level. For example, the subscriber fees for a subscription level (e.g., for a subscription offer) can be billed monthly, annually, or using any other billing periods, including a one-time pass, or a season pass. In one embodiment, the drop down menu 622 may be replaced with a text box to allow a channel curator to enter one or more dates (e.g., a start date, an end date, a date range, etc.) for the billing period.

The subscription offer menu 610 also includes drop down menu 631. The drop down menu 631 may allow a channel curator to specify a free trial duration or period for the channel "Bob's Channel." The free trial duration or period may indicate that an end user may be allowed to consume media items in a paid channel for a certain period of time (e.g., 1 month, 2 weeks, etc.), without paying a subscription fee. After the period of time elapses or expires an end user may no longer be able to consume media items in the paid until unless the end user pays a subscription fee.

The subscription offer menu 610 also includes checkboxes 641, 642, and text fields 643, 644, and 645 to allow the channel curator to define a subscriber set of advertising attributes (e.g., advertising attributes available to subscribers at a subscription level) for a subscription level (e.g., for a subscription offer). Advertising attributes may be specified for individual channels or multiple channels (e.g., component channels of a composite channel, channels of the same curator, channels having the same theme, etc.). As discussed above, advertising attributes may determine how advertisements are presented to users. For example, advertising attributes may be an instruction to display no advertisements to subscribers of a channel, may decrease a number of advertisements presented to the end user after the end user has consumed at least one media item of a channel may decrease of an aggregate length of time advertisements are presented to the end user after the end user has consumed at least one of media items of the channel, may indicate a duration for presenting an advertisement, or may indicate an option to skip an advertisement presentation within the channel. In one embodiment, the advertising attributes included in the subscription offer menu 610 may be a subscriber set of advertising attributes, because the advertising attributes are associated with a subscription offer.

The subscription offer menu 610 also includes checkboxes 651, 652, 654, 656, and 658, and drop down menus 653, 655, and 657 to allow the channel curator to define types of access that can be available to users when consuming content at a subscription level. Types of access can include a quality characteristic of the media item (e.g., video resolution, such as HD, 4k, 1080p, 1080i, 720p, etc.), offline access (e.g., caching content for offline consumption), an addition of subtitles to the media items, changing a language of the media items, access to content via additional user devices (e.g., a mobile phone, a table, etc.). Types of access attributes may be specified for individual channels or multiple channels (e.g., component channels of a composite channel, channels of the same curator, channels having the same theme, etc.). Checkbox 651 may allow a channel curator to indicate that subtitles may be added to media items in the channel. Checkbox 652 may allow a channel curator to indicate that the language of the media items in the channel may be changed. The drop down menu 653 may allow the channel curator to select and/or identify the languages for the media items in the channel. The checkbox 652 may allow the channel curator to indicate that the media items in the channel are available at different quality levels (e.g., different resolutions, different bit rates, etc.). The dropdown menu 655 may allow the channel curator to identify and/or select the different quality levels that are available. The checkbox 656 may allow the channel curator to indicate that whether additional user devices should be allowed to consume media items in the channel. The drop-down menu 657 may allow the channel curator to identify and/or select the additional user devices (e.g., smartphones or mobiles, tablet computers, etc.) that are allowed to consume media items in the channel.

After the channel curator has selected one or more options from the subscription offer menu 610 (e.g., geographic location for a subscription level (e.g., a subscription offer), a subscription fee (e.g., a price), a duration (e.g., a billing period), whether there is a free trial for the channels, advertisement attributes, and/or different types of access), the channel curator may create a subscription level (e.g., a subscription offer) by activating (e.g., clicking and/or selecting) the button 662. The channel curator may also cancel the creation of a subscription level (e.g., a subscription) by activating (e.g., clicking and/or selecting) the button 661.

In one embodiment, the subscription offer menu 610 may include fewer or more options. For example, the internet-based sharing platform may not allow users offline access so checkbox 658 may not be included in subscription offer menu 610. It should be understood that any combination of advertising attributes and/or types of access may be presented in the subscription offer menu 610.

Figure 7:
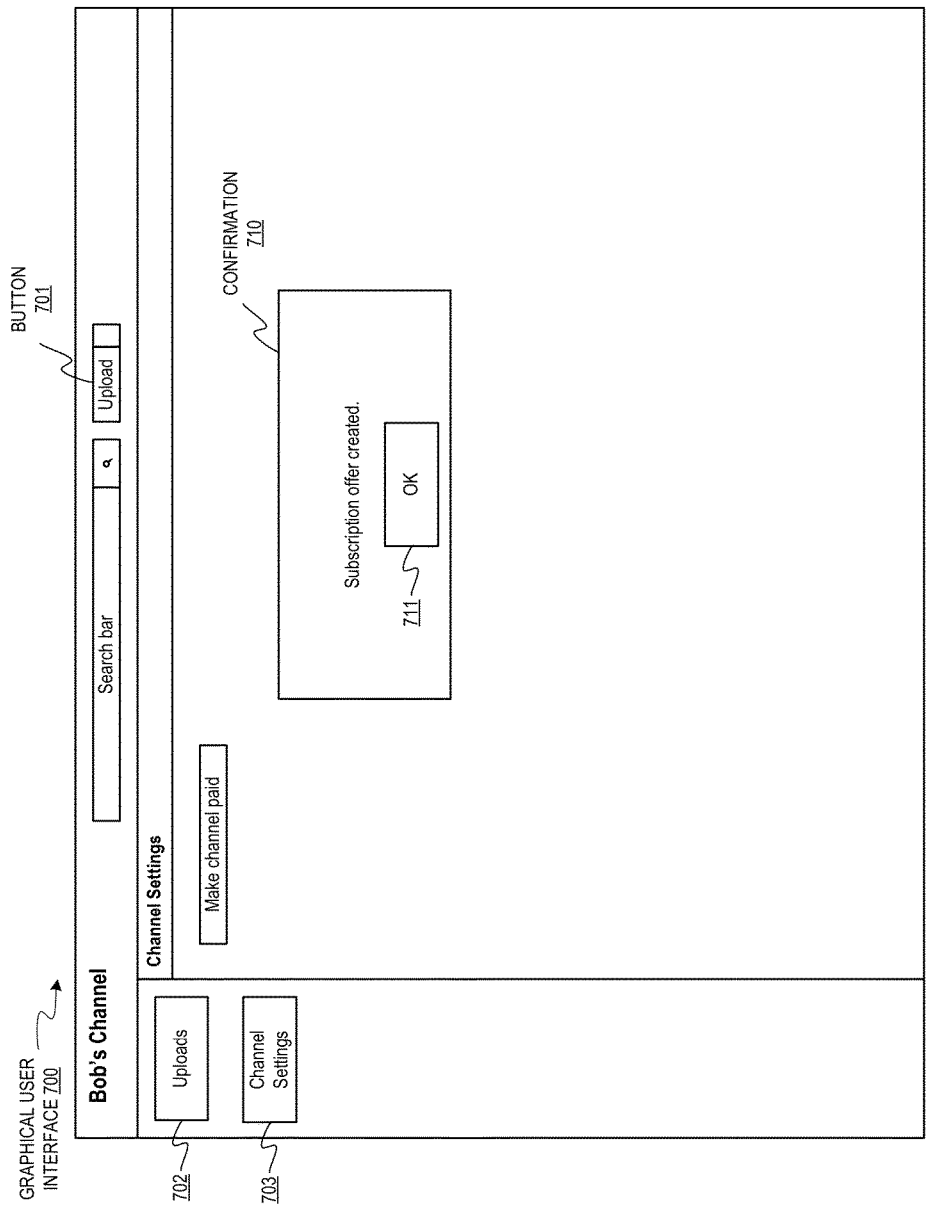
FIG. 7 illustrates a GUI for confirm that a subscription level has been created, according to one embodiment of the present disclosure.

FIG. 7 illustrates a GUI 700 for confirming that a subscription level (e.g., a subscription offer) has been created, according to one embodiment of the present disclosure. The GUI 700 includes button 701, button 702, button 703, button 705, and confirmation 710. As discussed above, the button 701 may allow a channel curator to upload one or more media items to the internet-based content platform. For example, the GUI 400 illustrated in FIG. 4 (and which allows a channel curator to upload media items) may be presented to the channel curator when the channel curator activates button 701. The button 702 may allow a channel curator to view and/or manage media items in the channel (e.g., in Bob's Channel) as discussed above in conjunction with FIG. 5A. The button 703 may allow the channel curator to view and/or manage the settings for the channel "Bob's Channel" (as discussed above in conjunction with FIG. 6).

The GUI 700 includes a confirmation 710. The confirmation 710 may be presented to the channel curator to confirm to the channel curator that the internet-based content platform has successfully created a subscription offer (e.g., a subscription level). The confirmation 710 includes the text "Subscription offer created" and a button 711. The channel curator may dismiss and/or close the confirmation 710 by activating (e.g., clicking and/or selecting) the button 711.

Figure 8A:
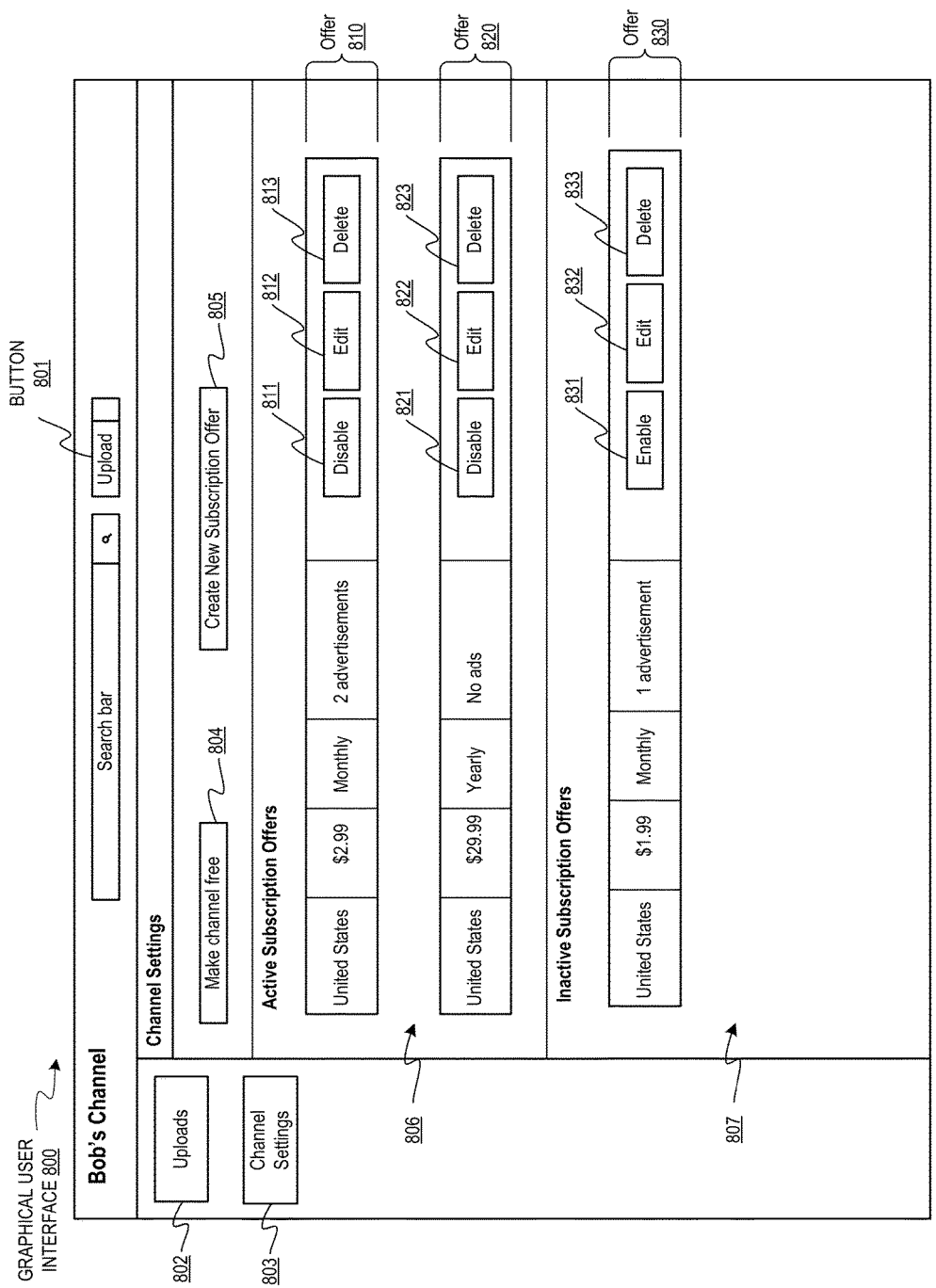
FIG. 8A illustrates a GUI for managing subscription offers, according to one embodiment of the present disclosure.

FIG. 8A illustrates a GUI 800 for managing subscription offers (e.g., subscription levels), according to one embodiment of the present disclosure. The GUI 800 includes button 801, button 802, button 803, button 804, button 805, an Active Subscription Offers section 806 and an Inactive Subscription Offers section 807. As discussed above, the button 801 may allow a channel curator to upload one or more media items to the internet-based content platform. For example, the GUI 400 illustrated in FIG. 4 (and which allows a channel curator to upload media items) may be presented to the channel curator when the channel curator activates button 801. The button 802 may allow a channel curator to view and/or manage media items in the channel (e.g., in Bob's Channel) as discussed above in conjunction with FIG. 5A. The button 803 may allow the channel curator to view and/or manage the settings for the channel "Bob's Channel" (as discussed above in conjunction with FIG. 6).

In one embodiment, Bob's Channel is a paid channel (e.g., a channel where an end user may subscribe to the channel only by paying a subscription fee). The button 804 may allow the channel curator to change Bob's Channel to a free channel (e.g., a channel where a user may subscribe to the channel without paying a subscription fee). The button 805 allows the channel curator to create a new subscription offer (e.g., a new subscription level for Bob's Channel). For example, when the channel curator activates (e.g., clicks and/or selects) button 805, the internet-based content platform may present the channel curator with the subscription offer menu 610 illustrated in FIG. 6 to allow the channel curator to provide input for creating a new subscription offer (e.g., a new subscription level).

The Active Subscription Offers section 806 includes offers 810 and 820 (e.g., subscription levels). In one embodiment, the Active Subscription Offers section 806 includes subscription levels that an end user may select when subscribing to Bob's Channel. For example, offer 810 (e.g., subscription level) allows end users in the United States to subscribe to Bob's Channel on a monthly basis at a price (e.g., a subscription fee) of $2.99 a month. Two advertisements will be displayed to an end user when the end user selects offer 810 and views media items from Bob's channel. Offer 820 allows end users in the United States to subscribe to Bob's Channel on a yearly basis at a price (e.g., a subscription fee) of $29.99 a year. No advertisements will be displayed to the end user when the end user selects offer 820 and views media items from Bob's channel.

Offer 810 also includes button 811, 812, and 813. Button 812 allows the channel curator to edit the offer 810 and button 822 allows the channel curator to edit offer 820. For example, when the channel curator activates button 812, a new menu (not shown in the figures) similar to the subscription offer menu 610 (illustrated in FIG. 6) may be displayed to the channel curator. The fields, checkboxes, text boxes, radio buttons, drop down menu, and/or other user interface elements of the new menu may contain (e.g., may be filled and/or populated) with options and/or values from the offer 810. The channel curator may change options for the offer 810 (e.g., change advertising attributes, type of access, subscription fee, billing period, etc.) using the new menu. Button 813 allows the channel curator to delete offer 810 and button 823 allows the channel curator to delete offer 820 (e.g., disassociate offer 820 with the channel). When the channel curator activates one of buttons 813 and/or 823, the channel curator may be prompted with user interface to confirm the deletion of offer (as discussed below and illustrated in FIG. 8B). Button 811 allows a channel curator to disable offer 810 and button 821 allows a channel curator to disable offer 820. When the channel curator activates one of buttons 813 and/or 823, the channel curator may be prompted with user interface to confirm that the offer should be disabled (as discussed below and illustrated in FIG. 8C). When an offer is disabled, the offer may be moved to Inactivate Subscription Offers section 807. For example, if the channel curator activates button 811, the offer 810 may be moved from the Active Subscription Offers section 806 to the Inactive Subscription Offers section 807.

The Inactive Subscription Offers section 807 includes offers 930 (e.g., a subscription level). In one embodiment, the Inactive Subscription Offers section 807 includes subscription levels that an end user may not select when subscribing to Bob's Channel. For example, the offer 830 may be an inactive offer (e.g., a subscription level that a user can no longer select) end users may have been able to select in the past. The channel curator may disable an offer (e.g., change the offer to an inactive offer) because the channel curator does not want to delete the offer, but does not want end users to subscribe to the channel using the offer (e.g., the subscription level). Offer 830 previously allowed end users in the United States to subscribe to Bob's Channel on a monthly basis at a price (e.g., a subscription fee) of $1.99 a month. One advertisement would be displayed to the end user when the end users previously selected offer 830 and viewed media items from Bob's channel. Offer 830 (e.g., disabled/inactive offer or subscription level) includes buttons 831, 832, and 833. Button 832 may allow the channel curator to edit the offer 830. Button 833 may allow the channel curator to delete the offer 830. Button 831 allows a channel curator to enable offer 830. When an offer is enabled (e.g., re-enabled), the offer may be moved to Active Subscription Offers section 806. For example, if the channel curator activates button 831, the offer 830 may be moved from the Inactive Subscription Offers section 807 to the Active Subscription Offers section 806.

Figure 8B:
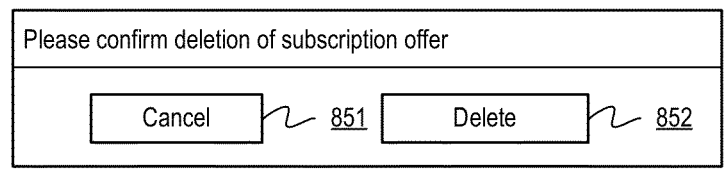
FIG. 8B illustrates a GUI for confirming the deletion of a subscription offer, according to one embodiment of the present disclosure.

FIG. 8B illustrates a GUI 850 for confirming the deletion of a subscription offer (e.g., subscription level), according to one embodiment of the present disclosure. The GUI 850 includes the text "Please confirm deletion of subscription offer." The GUI 850 also includes button 851 and button 852. When the channel curator activates (e.g., provides input activating and/or clicking) button 851 the internet-based content platform may cancel the deletion of the subscription offer. When the channel curator activates button 852, the internet-based content platform may complete the deletion of the subscription offer (e.g., may disassociate the subscription offer with the channel).

Figure 8C:
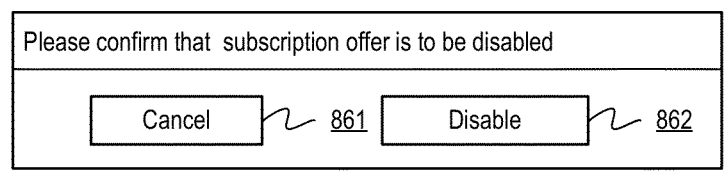
FIG. 8C illustrates a GUI for confirming that a subscription offer should be disabled, according to one embodiment of the present disclosure.

FIG. 8C illustrates a GUI 860 for confirming that a subscription offer (e.g., subscription level) should be disabled (e.g., made inactive), according to one embodiment of the present disclosure. The GUI 860 includes the text "Please confirm that the subscription offer is to be disabled." The GUI 850 also includes button 861 and button 862. When the channel curator activates (e.g., provides input activating and/or clicking) button 851 the internet-based content platform may cancel the disabling of the subscription offer. When the channel curator activates button 852, the internet-based content platform may complete the disabling of the subscription offer.

Figure 9:
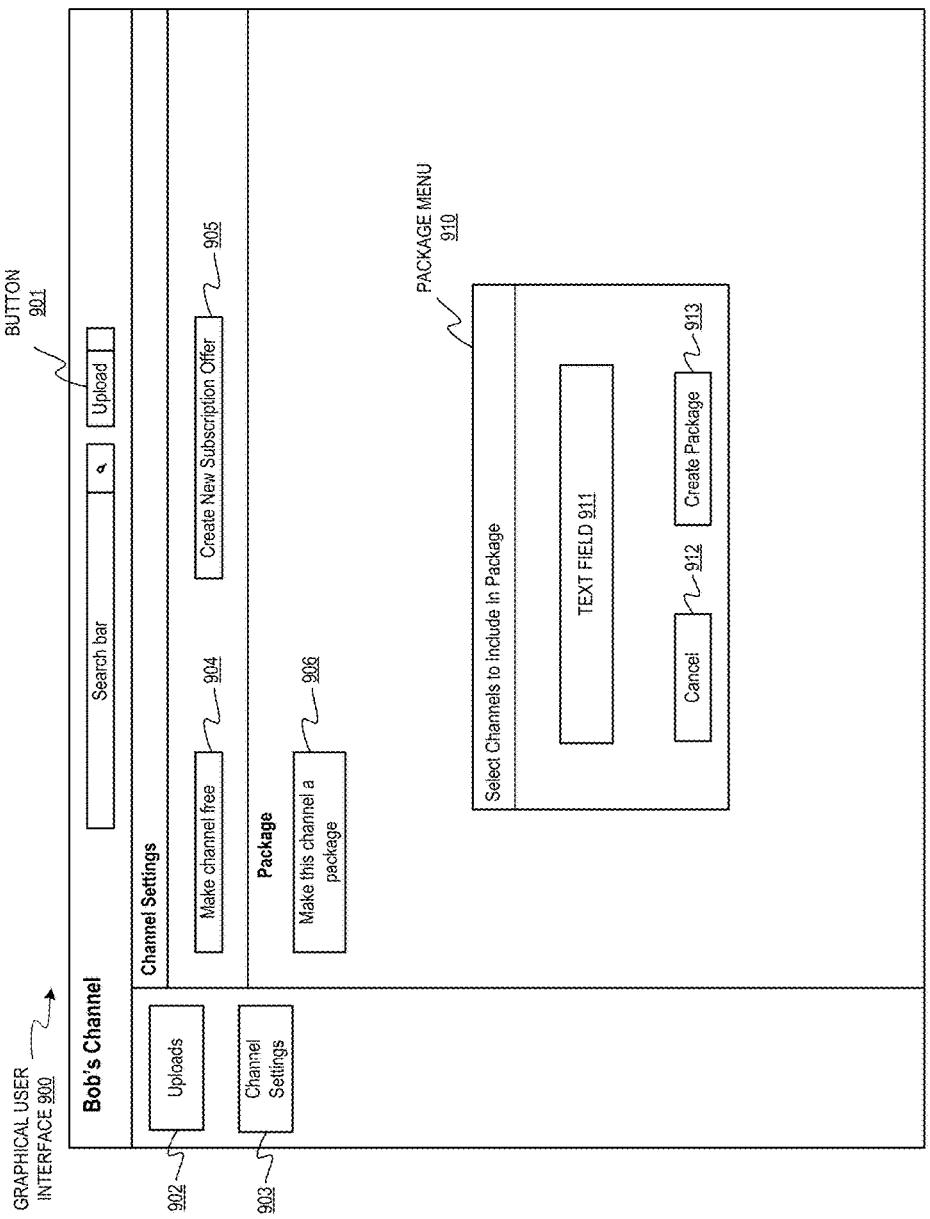
FIG. 9 is a GUI for creating a composite channel, according to one embodiment of the present disclosure.

FIG. 9 is a GUI 900 for creating a composite channel (e.g., a channel package or package), according to one embodiment of the present disclosure. The GUI 900 includes button 901, button 902, button 903, button 904, and button 905. As discussed above, the button 901 may allow a channel curator to upload one or more media items to the internet-based content platform. For example, the GUI 400 illustrated in FIG. 4 (and which allows a channel curator to upload media items) may be presented to the channel curator when the channel curator activates button 901. The button 902 may allow a channel curator to view and/or manage media items in the channel (e.g., in Bob's Channel) as discussed above in conjunction with FIG. 5A. The button 903 may allow the channel curator to view and/or manage the settings for the channel "Bob's Channel" (as discussed above in conjunction with FIG. 6). The button 904 may allow the channel curator to change Bob's Channel into a free channel (as discussed above in conjunction with FIG. 8A). The button 905 may allow the channel curator to create a new subscription offer (as discussed above in conjunction with FIGS. 6 and 8A).

The button 906 allows the channel curator to change and/or convert Bob's Channel into a composite channel. As discussed above, a composite channel is a channel that includes at least one component channel along with additional content (e.g., another component channel and/or a media item that is not part of any component channel). When the channel curator activates (e.g., clicks and/or selects) button 906, the package menu 910 may be presented to the channel curator in GUI 900. The package menu 910 includes text field 911, button 912, and button 913. The text field 911 may allow the channel curator to indicate (e.g., input) the names of channels that are to be added as component channels in the composite channel (e.g., package) "Bob's Channel." The text field 911 may also allow the channel curator to indicate individual media items that are to be added as additional content to the composite channel "Bob's Channel." In other embodiments, other user interface elements, such as drop down menus, check boxes, radio buttons, may be used in conjunction with or instead of text field 911 to allow the channel curator to identify additional component channels and/or media items to include in the composite channel. The button 912 may allow the channel curator to cancel the creation of the composite channel. The button 913 allows the channel curator to complete the creation of the composite channel. For example, after the channel curator activates button 913, the internet-based content platform may create the composite channel using the component channels and/or media items identified in text field 911.

In one embodiment, the channel curator for Bob's Channel may have privileges, rights, and/or permissions to include the additional component channels and/or media items in the composite channel "Bob's Channel." For example, a second channel curator (who is allowed to upload content to a second channel and/or manage a second channel) may grant the channel curator for Bob's Channel the ability to add the second channel to the Bob's Channel as a component channel. In one embodiment, the second channel curator may use an additional GUI (not shown in the figures) to identify the channel curator for Bob's channel and grant the channel curator for Bob's Channel the ability to add the second channel as a component channel. In another embodiment, the channel curator for Bob's Channel may request, via the internet based sharing platform, the ability to add the second channel as a component channel from the second channel curator. For example, the channel curator for Bob's Channel may send a message requesting the ability to add the second channel as a component channel to the internet-based sharing platform and the internet-based sharing platform may forward the request to the second channel curator. The second channel curator may deny or grant the request. A channel curator may have rights, privileges, and/or permissions from multiple other channel curators to add the other channels of the other channel curators to a composite channel.

In one embodiment, a separate GUI (not shown in the figures) may be provided to a channel curator to create a composite channel. For example, the channel curator may not convert an existing channel into a composite channel (e.g., a package or a channel package). The separate GUI may include user interface elements (e.g., text fields, buttons, drop down menu check boxes, etc.) that allow the channel curator to indicate a name for the composite channel and indicate one or more component channels and/or media items to include in the composite channel.

Figure 10:
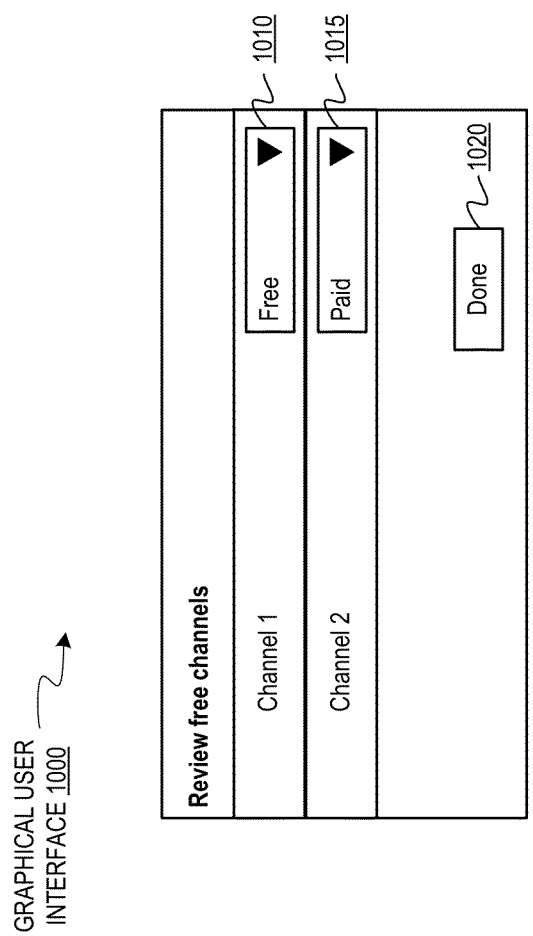
FIG. 10 illustrates a GUI for confirming whether a free channel should remain free when the channel is included in a composite channel, according to one embodiment of the present disclosure.

FIG. 10 illustrates a GUI 1000 for confirming whether a free channel should remain free when the channel is included in a composite channel, according to one embodiment of the present disclosure. The GUI 1000 includes a drop down menu 1010, drop down menu 1015, and button 1020. As illustrated in FIG. 10, Channel 1 and Channel 2 have been included in a composite channel. Channel 1 and Channel 2 may be free channels. When a free channel is added to a composite channel, the channel curator for the composite channel may be provided the option to change the free channel into a paid channel. The channel curator for the composite channel may use one of drop down menu 1010 or drop down menu 1015 to indicate that one or more of Channel 1 and Channel 2 are no longer free channels after they are included in the composite channel. Referring to FIG. 10, the channel curator has indicated that Channel 2 should be changed to a paid channel while Channel 1 should remain a free channel. After indicating that Channel 2 should be converted to a paid channel, the channel curator may activate (e.g., click and/or select) button 1020 and the internet-based content platform may convert Channel 2 to a paid channel.

Figure 11:
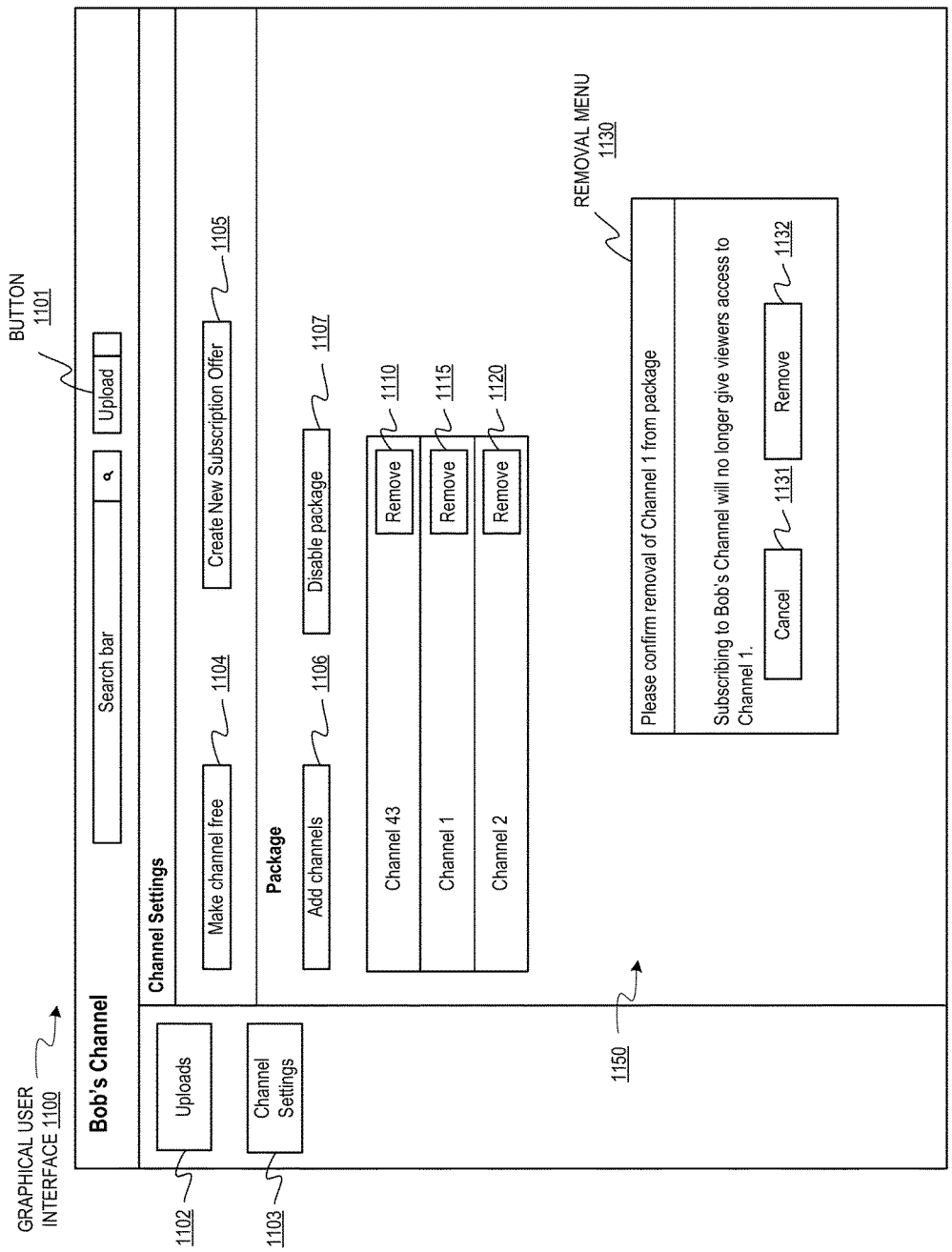
FIG. 11 illustrates a GUI for managing a composite channel, according to one embodiment of the present disclosure.

FIG. 11 illustrates a GUI 1100 for managing a composite channel (e.g., a package or a channel package), according to one embodiment of the present disclosure. The GUI 1100 includes button 1101, button 1102, button 1103, button 1104, and button 1105. As discussed above, the button 1101 may allow a channel curator to upload one or more media items to the internet-based content platform. For example, the GUI 400 illustrated in FIG. 4 (and which allows a channel curator to upload media items) may be presented to the channel curator when the channel curator activates button 1101. The button 1102 may allow a channel curator to view and/or manage media items in the channel (e.g., in Bob's Channel) as discussed above in conjunction with FIG. 5A. The button 1103 may allow the channel curator to view and/or manage the settings for the channel "Bob's Channel" (as discussed above in conjunction with FIG. 6). The button 1104 may allow the channel curator to change Bob's Channel into a free channel (as discussed above in conjunction with FIG. 8A). The button 1105 may allow the channel curator to create a new subscription offer (as discussed above in conjunction with FIGS. 6 and 8A).

The GUI 1100 also includes Packages section 1150. The Packages section 1150 includes button 1106, button 1107, button 1110, button 1120, and removal menu 1130. The button 1106 may allow the channel curator to add additional component channels to the composite channel "Bob's Channel." For example, when the channel curator activates button 1106, a menu similar to package menu 910 (illustrated in FIG. 9) may be presented to the channel curator and the channel curator may use the menu indicate additional component channels to include in the composite channel (e.g., the package or channel package). The button 1107 may allow the channel curator to disable the composite channel. For example, disabling the composite channel may remove all component channels from the composite channel (e.g., may remove channel 43, Channel 1, and Channel 2) from the composite channel. In another example, disabling the composite may not remove the component channels but may prevent users from subscribing to the composite channel.

Buttons 1110, 1115, and 1120 may allow a channel curator to remove individual component channels from the composite channel. For example, button 1110 may allow the channel curator to remove Channel 43 from the composite channel, button 1115 may allow the channel curator to remove Channel 1 from the composite channel, and button 1120 may allow the channel curator to remove Channel 2 from the composite channel. In one embodiment, when the channel curator activates one of the buttons 1110, 1115, or 1120, the removal menu 1130 may be presented by the GUI 1100. As illustrated in FIG. 11, the removal menu 1130 is presented after the channel curator activates (e.g., clicks and/or selects) button 1115. The removal menu 1130 includes text indicating that if Channel 1 is removed from the composite channel (e.g., Bob's Channel), "Subscribing to Bob's Channel will no longer give viewers access to Channel 1." The removal menu 1130 may allow the channel curator to confirm the removal of a component channel from the composite channel or cancel the removal of a component channel from the composite channel. For example, the channel curator may activate button 1131 to cancel the removal of a component channel or may activate button 1132 to confirm the removal of a component channel.

In one embodiment, when a channel is converted and/or changed to a component channel, the subscription levels that were available for the channel prior to the conversion to a component channel remain available for the composite channel. When an end user subscribes to the composite channel using a previously defined subscription level, the subscription level is used to grant access to media items each of the component channels and to any media items in the composite channel. For example, a subscription level for a channel may be associated with subscriber advertising attributes which indicate that no ads should be presented to the end user when view media items in the channel. When the channel is converted to a composite channel, the subscription level is used to grant access to media items in the component channels, and the internet-based content platform may not display ads when providing the end user with access to media items in the component channels. In another embodiment, the individual component channels may also remain associated with different subscription levels for the individual component channels after a component channel has been included in a composite channel. For example, although a component channel may be included in a composite channel, the user may still subscribe to a component channel (independent of the composite channel) using a subscription level that was previously associated with the component channel. The component channel may be associated with its own separate subscription offers separate from the subscription offers associated with the composite channel in which the component channel is included.

Figure 12:
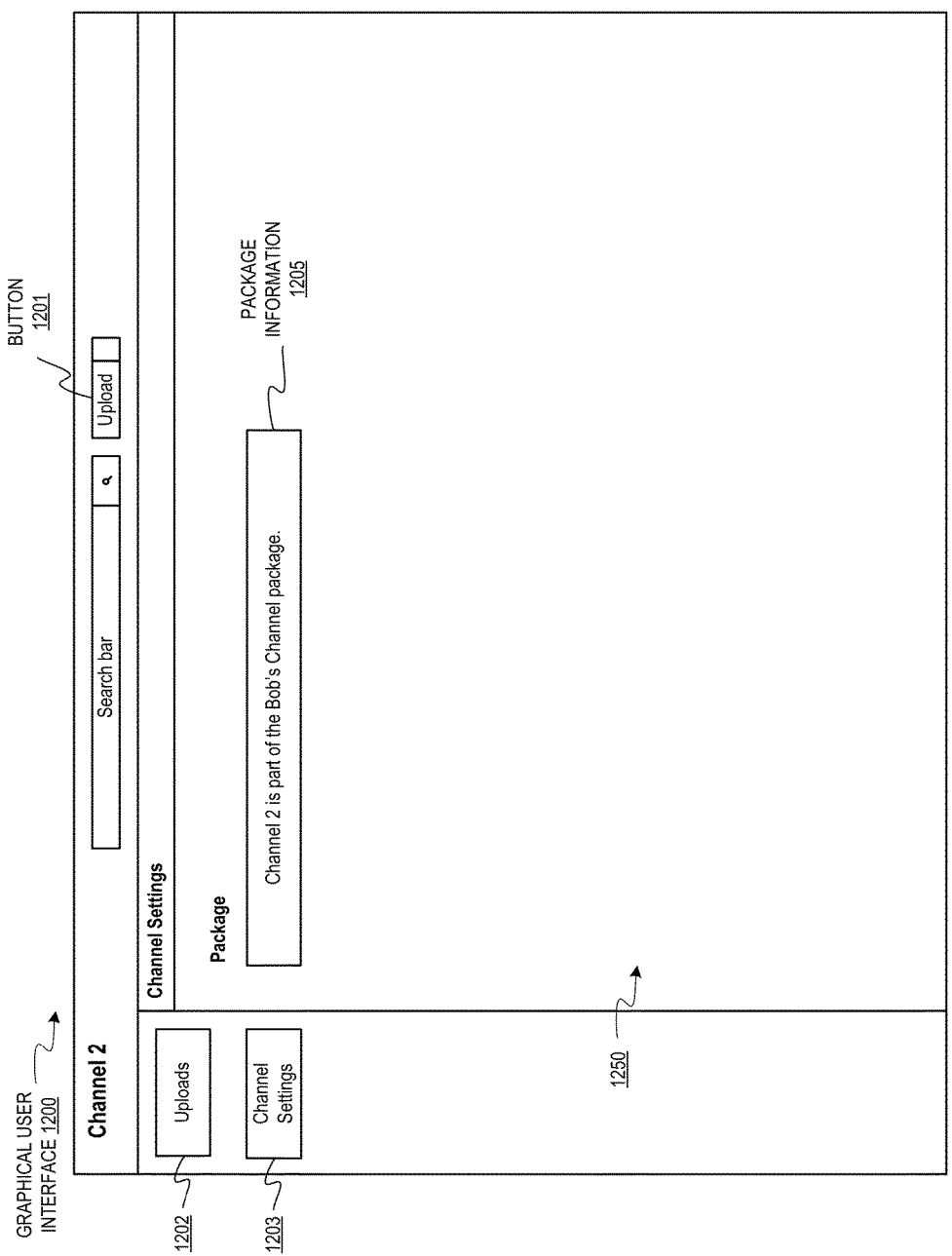
FIG. 12 illustrates a GUI for providing package information for a component channel, according to one embodiment of the present disclosure.

FIG. 12 illustrates a GUI 1200 for providing package information for a component channel, according to one embodiment of the present disclosure. The GUI 1200 includes button 1201, button 1202, and button 1203. As discussed above, the button 1101 may allow a channel curator to upload one or more media items to the internet-based content platform. For example, the GUI 400 illustrated in FIG. 4 (and which allows a channel curator to upload media items) may be presented to the channel curator when the channel curator activates button 1101. The button 1102 may allow a channel curator to view and/or manage media items in the channel (e.g., in Bob's Channel) as discussed above in conjunction with FIG. 5A. The button 1103 may allow the channel curator to view and/or manage the settings for the channel "Bob's Channel" (as discussed above in conjunction with FIG. 6). The GUI 1200 includes Package section 1250. The package section 1250 includes package information 1205 that indicates that the channel (e.g., Channel 2) is a component channel that is part of a composite channel (e.g., Bob's Channel).

Figure 13:
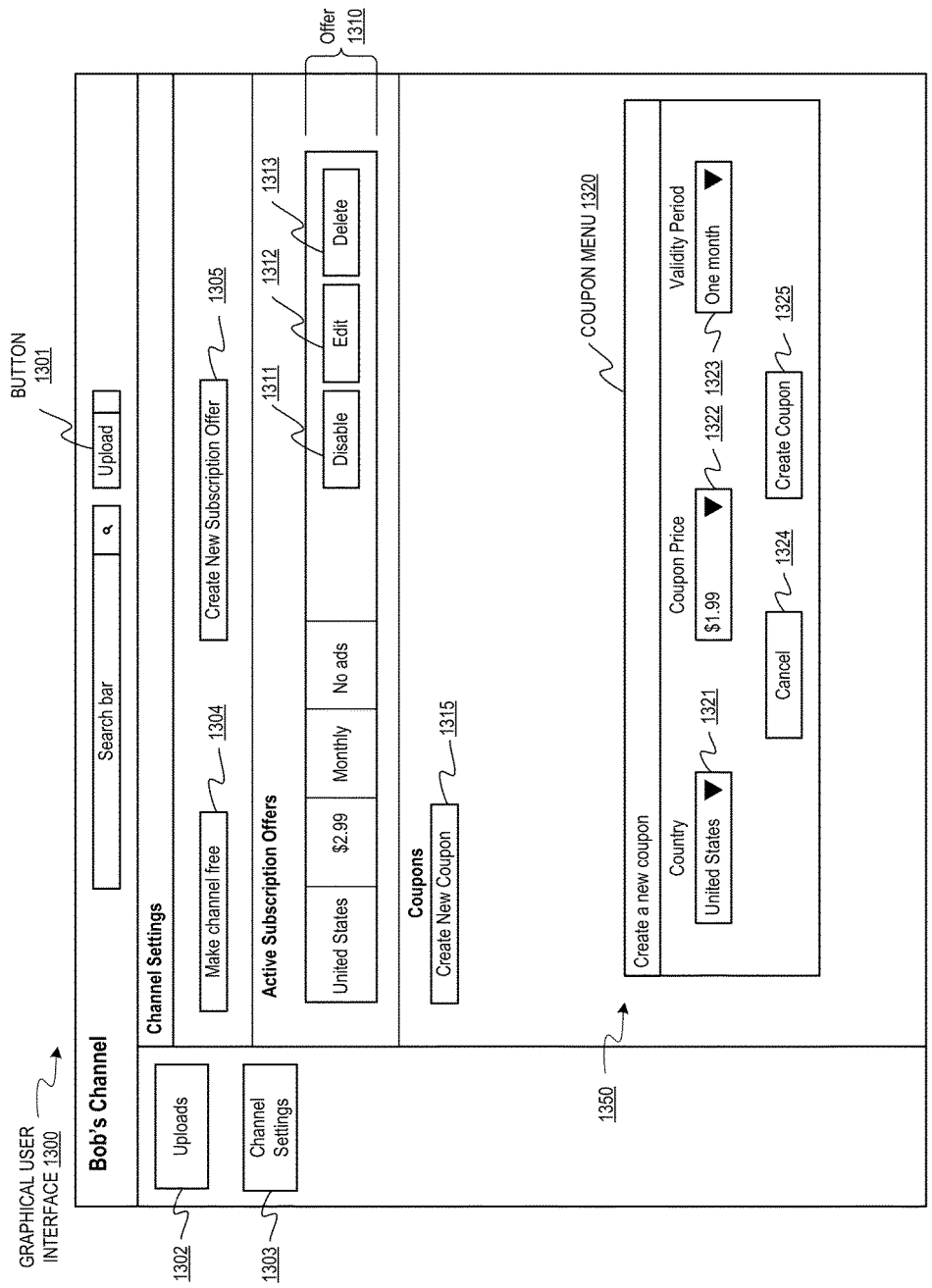
FIG. 13 illustrates a GUI for managing subscription offers, according to one embodiment of the present disclosure.

FIG. 13 illustrates a GUI 1300 for managing subscription offers (e.g., subscription levels), according to one embodiment of the present disclosure. The GUI 1300 includes button 1301, button 1302, button 1303, button 1304, button 1305, an Active Subscription Offers section 1306 and an Inactive Subscription Offers section 1307. As discussed above, the button 1301 may allow a channel curator to upload one or more media items to the internet-based content platform. For example, the GUI 400 illustrated in FIG. 4 (and which allows a channel curator to upload media items) may be presented to the channel curator when the channel curator activates button 1301. The button 1302 may allow a channel curator to view and/or manage media items in the channel (e.g., in Bob's Channel) as discussed above in conjunction with FIG. 5A. The button 1303 may allow the channel curator to view and/or manage the settings for the channel "Bob's Channel" (as discussed above in conjunction with FIG. 6). The button 1304 may allow the channel curator to change Bob's Channel to a free channel (e.g., a channel where a user may subscribe to the channel without paying a subscription fee). The button 1305 allows the channel curator to create a new subscription offer (e.g., a new subscription level for Bob's Channel).

Offer 1310 also includes button 1311, 1312, and 1313. Button 1312 allows the channel curator to edit the offer 1310. Button 1313 allows the channel curator to delete offer 1310 (e.g., disassociate offer 1310 with the channel). When the channel curator activates button 1313, the channel curator may be prompted with user interface to confirm the deletion of offer (as discussed above and illustrated in FIG. 8B). Button 1311 allows a channel curator to disable offer 1310. When the channel curator activates one of buttons 1313 and/or 1323, the channel curator may be prompted with user interface to confirm that the offer should be disabled (as discussed above and illustrated in FIG. 8C). When an offer is disabled, the offer may be moved to an Inactivate Subscription Offers section.

GUI 1300 also includes coupon section 1350. The coupon section 1350 includes button 1315 which allows the channel curator to reduce the subscription fee (e.g., the price) associate with one or offers (e.g., one or more subscription levels) for a period of time. For example, the button 1315 may allow the channel curator to create a coupon, a code, a promotion, etc., that decreases and/or reduces the subscription fee associated with an offer (e.g., with a subscription level). When the channel curator activates (e.g., clicks and/or selects) button 1315, the coupon menu 1320 may be displayed. The coupon menu includes drop down menu 1321, drop down menu 1322, drop down menu 1323, button 1324, and button 1325. The drop down menu 1321 allows the channel curator to indicate a geographical area (e.g., continent, country, state, county, city, etc.) where a coupon may be used. The drop down menu 1322 may allow a channel curator to identify a reduction in price for the subscription fee. For example, the drop down menu 1322 indicates that the price of a subscription to the channel using a coupon may be a reduce price of $1.99 (e.g., indicating a one dollar reduction in the price of the subscription). In other embodiments, the reduction and/or reduce price may be indicated in various way. For example, the drop down menu 1322 may indicate that the coupon provides a 20% reduction in the subscription fee for a subscription. The drop down menu 1323 allows the channel curator to indicate a valid period for the coupon. For example, the coupon may be valid for one month from the date the coupon was created by the channel curator. In another embodiment, text fields may be used to allow the channel curator to specific dates (e.g., a start date, an end date, a data range, etc.) for the coupon. The button 1324 allows the channel curator to cancel the creation of a coupon and the button 1325 allows the channel curator to create the coupon.

Figure 14:
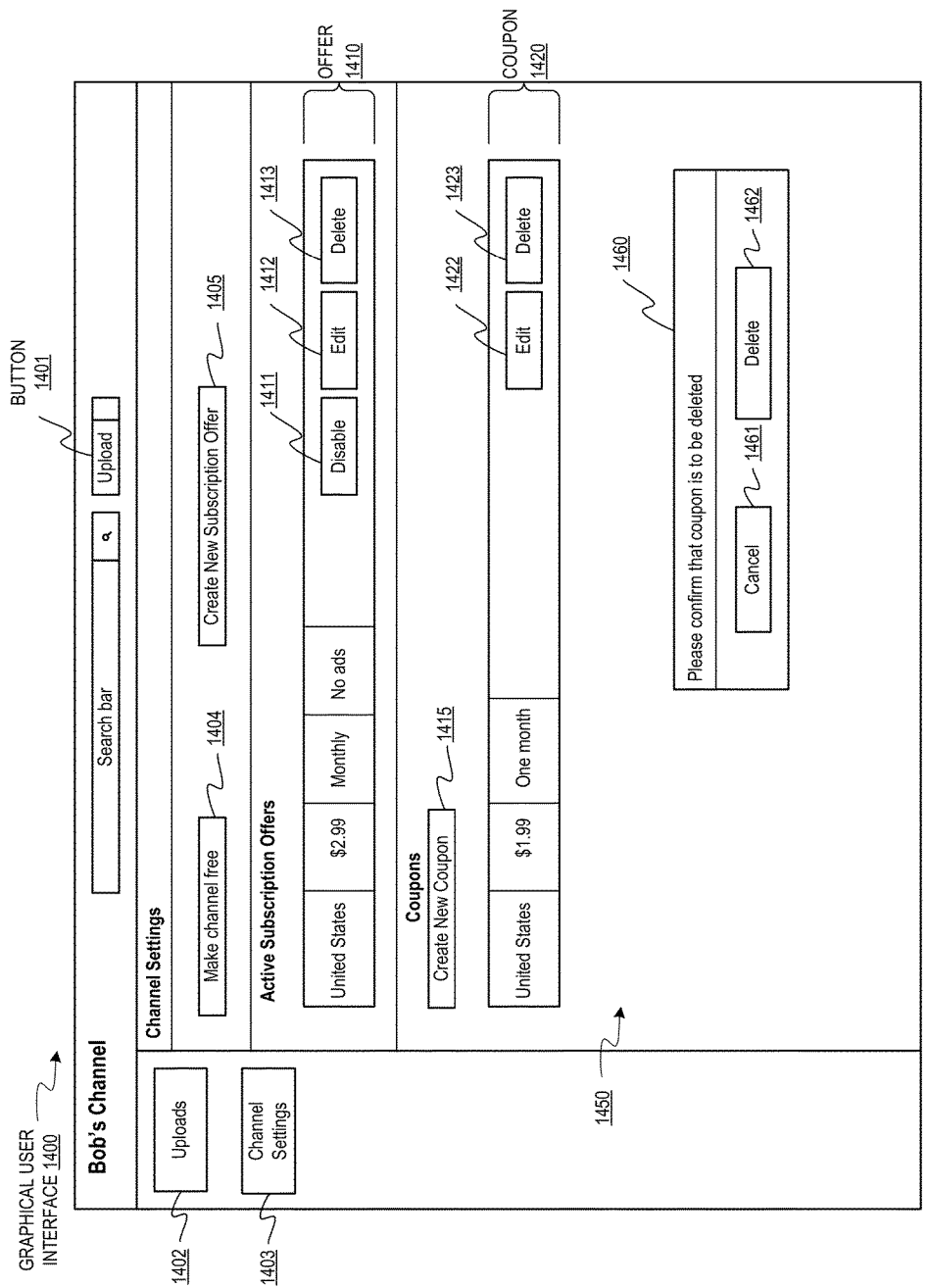
FIG. 14 illustrates a GUI for managing subscription offers, according to another embodiment of the present disclosure.

FIG. 14 illustrates a GUI 1400 for managing subscription offers (e.g., subscription levels), according to another embodiment of the present disclosure. The GUI 1400 includes button 1401, button 1402, button 1403, button 1404, button 1405, an Active Subscription Offers section 1406 and an Inactive Subscription Offers section 1407. As discussed above, the button 1401 may allow a channel curator to upload one or more media items to the internet-based content platform. For example, the GUI 400 illustrated in FIG. 4 (and which allows a channel curator to upload media items) may be presented to the channel curator when the channel curator activates button 1401. The button 1402 may allow a channel curator to view and/or manage media items in the channel (e.g., in Bob's Channel) as discussed above in conjunction with FIG. 5A. The button 1403 may allow the channel curator to view and/or manage the settings for the channel "Bob's Channel" (as discussed above in conjunction with FIG. 6). The button 1404 may allow the channel curator to change Bob's Channel to a free channel (e.g., a channel where a user may subscribe to the channel without paying a subscription fee). The button 1405 allows the channel curator to create a new subscription offer (e.g., a new subscription level for Bob's Channel).

Offer 1410 also includes button 1411, 1412, and 1413. Button 1412 allows the channel curator to edit the offer 1410. Button 1413 allows the channel curator to delete offer 1410 (e.g., disassociate offer 1410). When the channel curator activates button 1413, the channel curator may be prompted with user interface to confirm the deletion of offer (as discussed above and illustrated in FIG. 8B). Button 1411 allows a channel curator to disable offer 1410. When the channel curator activates one of buttons 1413 and/or 1423, the channel curator may be prompted with user interface to confirm that the offer should be disabled (as discussed above and illustrated in FIG. 8C). When an offer is disabled, the offer may be moved to an Inactivate Subscription Offers section.

GUI 1400 also includes coupon section 1450. The coupon section 1450 includes button 1415 which allows the channel curator to reduce the subscription fee (e.g., the price) associate with one or offers (e.g., one or more subscription levels) for a period of time. The coupon section 1450 also include coupon 1420. Coupon 1420 indicates that for end users in the United States, the price of a subscription (e.g., the subscription fee) of offer 1410 may be reduced to $1.99 for a period of one month. The coupon 1420 also includes buttons 1422 and 1423. The button 1422 may allow the channel curator to edit a coupon. When a channel curator activates button 1422, a menu similar to coupon menu 1320 (illustrated in FIG. 13) may be presented to the channel curator. When the channel curator activates button 1423, the confirmation 1460 may be presented to the channel curator. The confirmation 1460 includes two buttons 1461 and 1462. Button 1461 allows the channel curator to cancel the deletion of a coupon. Button 1462 allows a channel curator to confirm deletion of the coupon.

Figure 15:
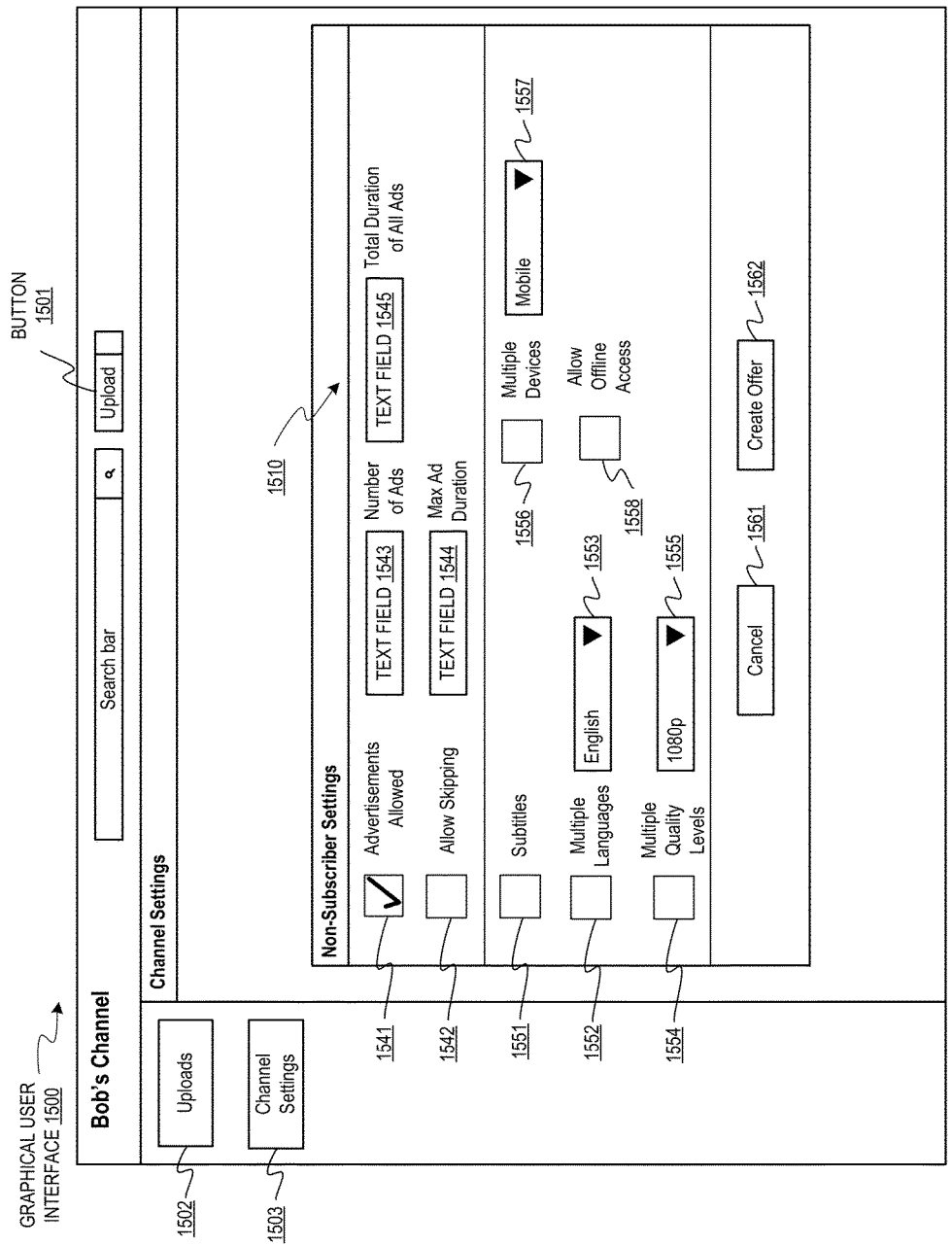
FIG. 15 illustrates a GUI for defining non-subscription settings for a channel, according to one embodiment of the present disclosure.

FIG. 15 illustrates a GUI 1500 for defining non-subscription settings for a channel, according to one embodiment of the present disclosures. The GUI 1500 includes button 1501, button 1502, button 1503, and Non-subscriber Settings section 1510. As discussed above, the button 1501 may allow a channel curator to upload one or more media items to the internet-based content platform. For example, the GUI 400 illustrated in FIG. 4 (and which allows a channel curator to upload media items) may be presented to the channel curator when the channel curator activates button 1501. The button 1502 may allow a channel curator to view and/or manage media items in the channel (e.g., in Bob's Channel) as discussed above in conjunction with FIG. 5A. The button 1503 may allow the channel curator to view and/or manage the settings for the channel "Bob's Channel" (as discussed above in conjunction with FIG. 6).

The Non-subscriber Settings section 1510 allows the channel curator to identify non-subscriber set of advertising attributes that may be used when the internet-based content platform provides media items to end users. In one embodiment, the non-subscriber set of advertising attributes are associated with the channel since the non-subscriber set of advertising attributes will be used to determine how to provide advertisements to users who have not subscribed to the channel. The checkbox 1541 allows the channel curator to indicate that advertisements will be displayed to an end user if the end user is not subscribed to the channel and the end user consumes media items from the channel. The checkbox 1542 allows the channel curator to indicate that an end user may not be able to skip advertisements when the user is not subscribed to the channel. Text field 1543 allows the channel curator to identify a number of ads that may be displayed to a user when the user is not subscribed to the channel. Text field 1544 allows the curator to identify a maximum duration for a single ad when the user is not subscribed to the channel. Text field 1545 allows the channel curator to identify a total duration for all ads when the user is not subscribed to the channel.

The Non-subscriber Settings section 1510 allows the channel curator to identify different types of access that may be used when the internet-based content platform provides media items to end users. For example, checkbox 1551 (when unchecked) may allow the channel curator to prevent subtitles from appearing if the user is not subscribed to the channel. Checkbox 1552 (when unchecked) may allow the channel curator to prevent a media item from playing in different languages when the user is not subscribed to the channel. Checkbox 1552 (when unchecked) may allow the channel curator to prevent a media item from playing in different quality levels (e.g., different resolutions or bit rates) when the user is not subscribed to the channel. Checkbox 1556 (when unchecked) may allow the channel curator to prevent a media item from playing on different computing devices when the user is not subscribed to the channel. Checkbox 1558 (when unchecked) may allow the channel curator to prevent a media item from being played offline (e.g., no offline access) when the user is not subscribed to the channel.

Figure 16:
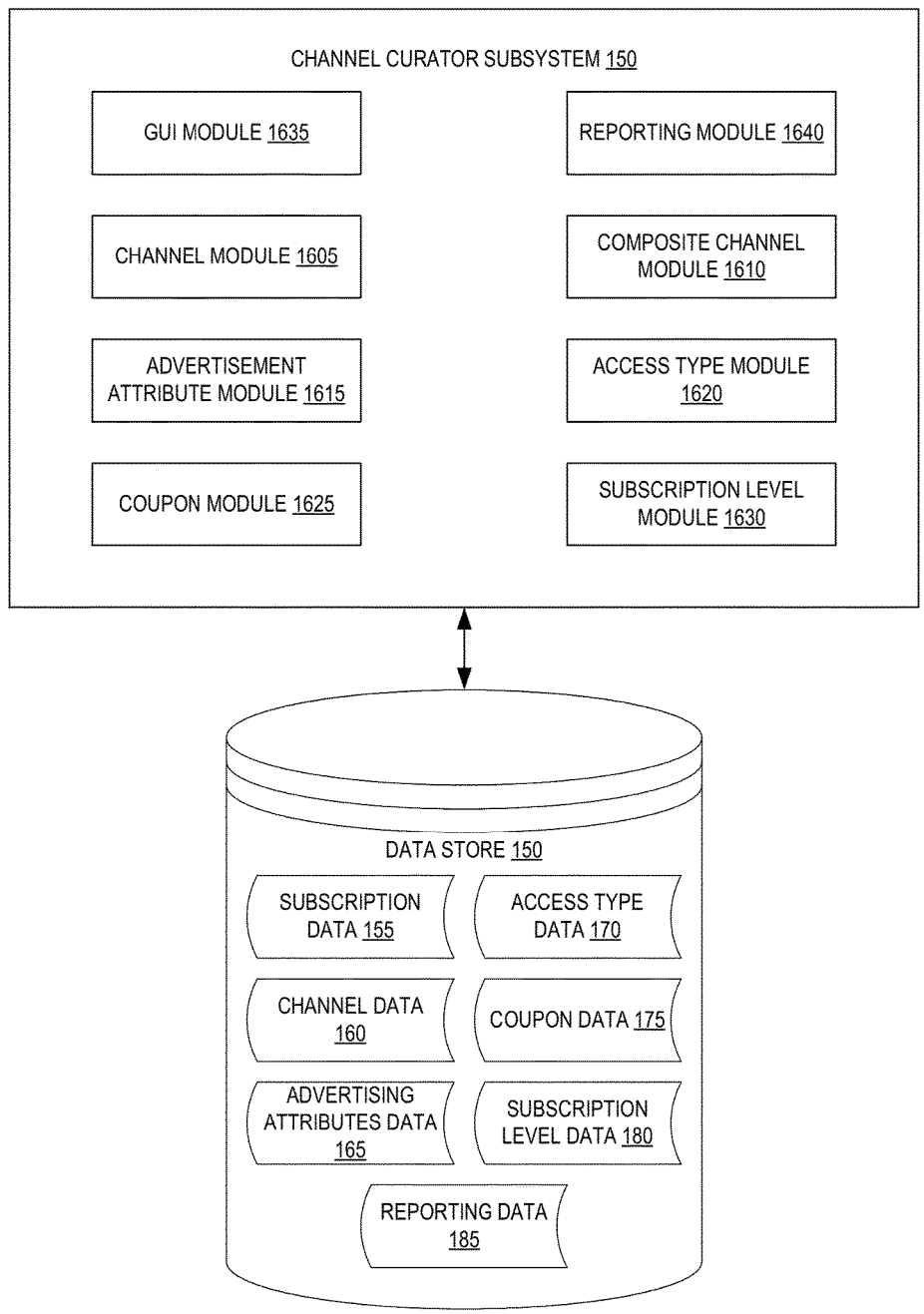
FIG. 16 is a block diagram of a channel curator subsystem, according to one embodiment of the present disclosure.

FIG. 16 is a block diagram of a channel curator subsystem 146, according to one embodiment of the present disclosure. The channel curator subsystem 146 includes a channel module 1605, a composite channel module 1610, an advertisement attribute module 1615, an access type module 1620, a coupon module 1625, a subscription level module 1630, a GUI module 1635, and reporting module 1640. More or less components may be included in the channel advertisement management subsystem 400 without loss of generality. For example, some modules may be combined into a single module, or any of the modules may be divided into two or more modules. In one implementation, one or more of the modules may reside on different computing devices (e.g., different server computers).

The channel curator subsystem 146 is communicatively coupled to the data store 150. For example, the channel curator subsystem 146 may be coupled to the data store 150 directly or via a network (e.g., via network 115 as illustrated in FIG. 1).

In one embodiment, the GUI module 1635 may generate and/or present GUIs to a channel curator. For example, the GUI module 1635 may present any of the GUIs illustrated in FIGS. 2-15 to a channel curator. The GUI module 1635 may also receive input provided by the channel curator. For example, text entered into a text field by a channel curator, the selection of a checkbox, a selection of an item in a drop down menu, etc., may be received by the GUI module 1635.

In one embodiment, the channel module 1605 may create a channel based on input received (via a GUI) from the channel curator. For example, the channel module 1605 may receive the name (e.g., identification information) of the channel and a list of media items to associate with the channel. In one embodiment, the list of media items may include paid media items, free media items, and/or both. The channel module 1605 may create the channel and may store information about newly created channels (e.g., name for the channel, list of media items, etc.) in the channel data 160.

In one embodiment, the composite channel module 1610 may create a composite channel based on input received (via a GUI) from the channel curator. For example, the composite channel module 1610 may receive input indicating that a channel should be converted into a composite channel. The composite channel module 1610 may also receive input indicating a list of component channels and/or media items to include in the composite channel. The composite channel module 1610 may authenticate the channel curator for the composite channel to determine whether the channel curator has permissions to add the component channels to the composite channel. If the channel curator is authorized to add the component channels to the composite channel, the composite channel module 1610 may create the composite channel and may store information about composite channels (e.g., name for the composite channel, list of media items, list of component channels, etc.) in the channel data 160.

In one embodiment, the subscription level module 1630 may receive input (via a GUI) identifying a subscription fee, a geographical location, and a time period or duration. The subscription level module 1630 may create a new subscription level (e.g., a subscription offer) based on the input. The subscription level module 1630 may store the subscription level in the subscription level data 180. In one embodiment, subscription levels may be associated with one or more subscriber advertising attributes and/or one or more types of access. The subscription level data 180 may also include subscription advertising attributes associated with different subscription levels and types of access associated with the different subscription levels. The subscription level module 1630 may also receive input from the channel curator to delete (e.g., disassociate) and/or modify one or more subscription levels. The subscription level module 1630 may update the subscription level data 180 based on the input.

In one embodiment, the advertisement attribute module 1615 may access advertising attributes data 165 and may present a channel curator with a GUI indicating the different advertising attributes that are available. The advertisement attribute module 1615 may receive input (via a GUI) from a channel curator identifying one or more subscriber advertising attributes that should be associated with a subscription level. For example, the advertisement attribute module 1615 may receive data indicating that no ads should be presented to users for a particular subscription level. The advertisement attribute module 1615 may store the subscriber advertising attributes for the particular subscription level in the subscription level data 180. The advertisement attribute module 1615 may also receive input from the channel curator to delete (e.g., disassociate) and/or modify one or more advertising attributes associated with a subscription level. The advertisement attribute module 1615 may update the subscription level data 180 based on the input.

In one embodiment, the access type module 1620 may use access type data 170 and may present a channel curator with a GUI indicating the types of access that are available. The access type module 1620 may receive input (via a GUI) from a channel curator identifying one or more types of that should be associated with a subscription level. For example, the advertisement attribute module 1615 may receive data indicating that subtitles and offline access should be allowed for a particular subscription level. The access type module 1620 may store the types of access for the particular subscription level in the subscription level data 180. The access type module 1620 may also receive input from the channel curator to delete (e.g., disassociate) and/or modify one or more types of access associated with a subscription level. The access type module 1620 may update the subscription level data 180 based on the input.

In one embodiment, the coupon module 1625 may receive input (via a GUI) from a channel curator identifying a reduction in a subscription fee and a period of time for the reduction. For example, the coupon module 1625 may receive input indicating that a subscription fee for a channel should be reduced by five dollars for the next month. The coupon module 1625 may store the reduction in the subscription fee and the period of time in the coupon data 175. The coupon module 1625 may also receive input from the channel curator to delete (e.g., disassociate) one or coupons and/or to modify one or more coupons. The coupon module 1625 may update the coupon data 175 (e.g., modify a coupon, delete a coupon) based on the input received from the channel curator.

In one embodiment, the reporting module 1640 may provide a channel curator with reporting capabilities for the media items, channels, and/or composite channels. The reporting module 1640 may allow a channel curator to view statistics such as how often a media item was consumed, popular times when a media item was consumed, the amount of times a media item was consumed over a period of time, the amount of revenue (e.g., money) earned from a media item when end users rent and/buy a media item. The reporting module 1640 may allow a channel curator to view statistics about a channel. For example, the channel curator may a determine how many people have subscribed to a channel, the most popular media items in the channel, the number of times each media item in the channel was consumed, and how much revenue was generated from subscriptions to the channel. The reporting module 1640 may also allow a channel curator to view statistics for composite channels. For example, the channel curator may a determine how many people have subscribed to a composite channel, the most popular media items in the composite channel and/or component channels, the most popular component channels, the number of times each media item in the channel was consumed, and how much revenue was generated from subscriptions to the composite channel, etc. In one embodiment, the reporting module 1640 may store these statics in the reporting data 185 so that channel curators may access them at a later time.

FIGS. 17-22 are flow diagrams illustrating methods for performing various operations, in accordance with some embodiments of the present disclosure, including defining paid channels and subscription options for paid channels. The methods may be performed by processing logic that comprises hardware (e.g., circuitry, dedicated logic, programmable logic, microcode, etc.), software (e.g., instructions run on a processor to perform hardware simulation), or a combination thereof. Processing logic can control or interact with one or more devices, applications or user interfaces, or a combination thereof, to perform operations described herein. When presenting, receiving or requesting information from a channel curator, processing logic can cause the one or more devices, applications or user interfaces to present information to the channel curator and to receive information from the channel curator.

For simplicity of explanation, the methods of FIGS. 17-22 are depicted and described as a series of operations. However, acts in accordance with this disclosure can occur in various orders and/or concurrently and with other operations not presented and described herein. Furthermore, not all illustrated operations may be required to implement the methods in accordance with the disclosed subject matter. In addition, those skilled in the art will understand and appreciate that the methods could alternatively be represented as a series of interrelated states via a state diagram or events.

Figure 17:
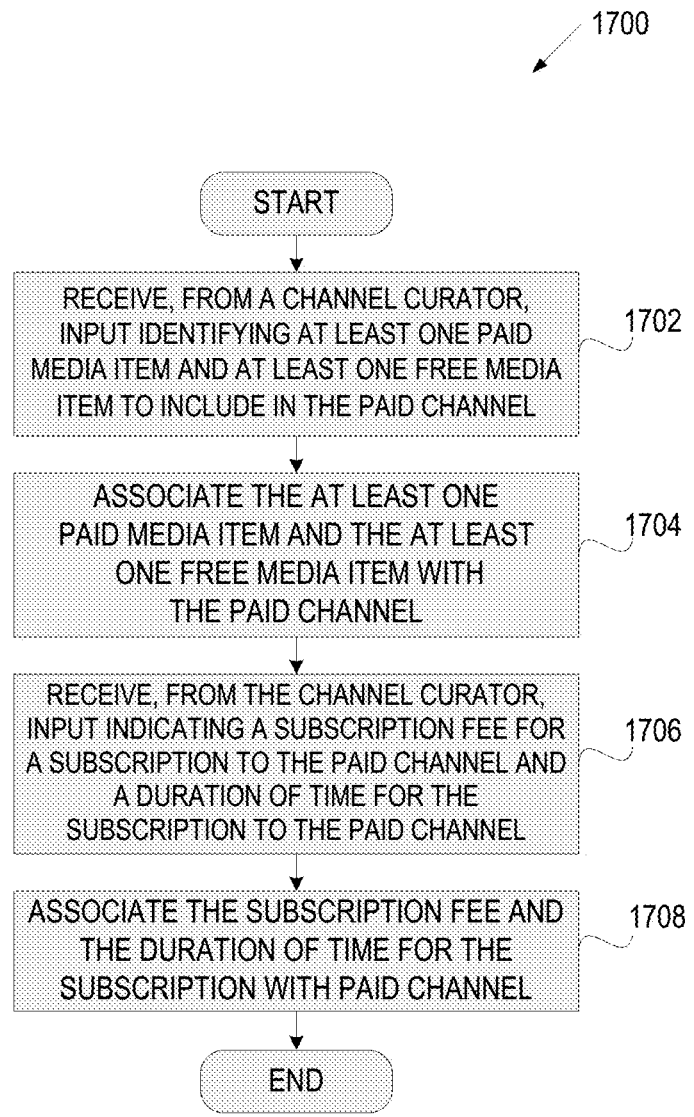
FIG. 17 is a flow diagram illustrating a method of defining a channel in an internet-based content platform, in accordance with some embodiments of the present disclosure.

FIG. 17 is a flow diagram illustrating a method 1700 of defining a channel in an internet-based content platform, in accordance with some embodiments of the present disclosure. In one implementation, method 1700 may be performed by a channel curator subsystem, as illustrated in FIGS. 1 and 16.

Referring to FIG. 17, method 1700 begins at block 1702 where processing logic receives, from a channel curator, input identifying at least one paid media item and at least one free media item to include in a paid channel. This input can be received via a user interface that allows a curator to specify media items to be included in a paid channel of the curator. A paid media item can refer to a media item that will not be allowed to be consumed by an end user unless the end user subscribes to the paid channel. A free media item can refer to a media item that will be allowed to be consumed by an end user who is not a subscriber of the paid channel. The free media item can be a preview of a paid media item that can be used to encourage a user to subscribe to the paid channel. Preview can refer to a shortened version of a media item such as a portion of the media item. For example, a preview of a video can be a trailer (a combination of some of the scenes) of the video, a predefined duration of the video, etc. In another implementation, the free media item is not a preview of any paid media items of the channel but an independent or separate media item (e.g., a complete movie or a complete video clip) that can have its own preview. A free media item can be accessed by the end user from a list of media item of the paid channel. As such, a free media item can be included in the paid channel by the curator to spark the end user's interest in the content of the paid channel.

At block 1704, processing logic receives from the channel curator input indicating a subscription fee for a subscription to the paid channel and the duration of time for the subscription to the paid channel. At block 1706, processing logic associates the subscription fee and the duration of time for the subscription with the paid channel (e.g., by storing the subscription fee and the subscription duration with an identifier of the paid channel in a data store).

Once a paid channel is created, it can be immediately (without any noticeable delay) seen by end users of the internet-based content platform (e.g., via various GUIs provided by the internet-based content platform). An end user can then subscribe to the paid channel by submitting a subscription request and providing a subscription fee defined by the curator of the paid channel. The subscription to the channel is then dynamically created for the end user, and the end user is provided access to the content of the paid channel in real time (without any noticeable delay). Access to the content of the paid channel can be provided to the end user via a user interface, which can be the same user interface as the one used for creating the user subscription. This user interface can include a series of screens that appear in real time (immediately after receiving a corresponding input from the end user) one after another on the user device, without requiring the end user to launch another application (e.g., another mobile app) and/or another instance of the current application (e.g., another instance or tab of the web browser) on the user device.

In some implementations, processing logic can receive a request of the channel curator to define temporary subscription to the paid channel during a limited time period. Temporary subscription can be free or for a reduced fee. In some implementations, a channel curator can define a promotional offer for a paid channel.

Figure 18:
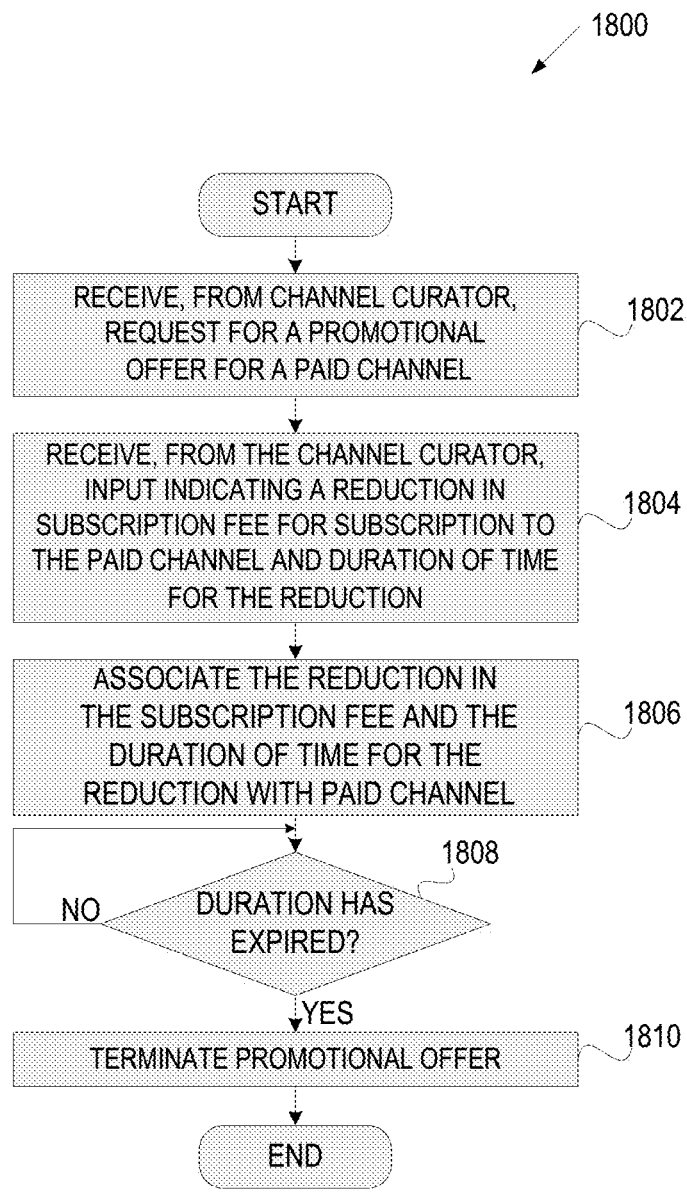
FIG. 18 is a flow diagram illustrating a method for defining a promotional offer for a paid channel in an internet-based content platform, in accordance with some embodiments of the present disclosure.

FIG. 18 is a flow diagram illustrating a method 1800 for defining a promotional offer for a paid channel in an internet-based content platform, in accordance with some embodiments of the present disclosure. In one implementation, method 1800 may be performed by a channel curator subsystem, as illustrated in FIGS. 1 and 16.

Referring to FIG. 18, method 1800 begins at block 1802 where processing logic receives, from a channel curator, a request for a promotional offer for a paid channel of the channel curator. At block 1804, processing logic receives, from the channel curator, input indicating a reduction in a subscription fee for a subscription to the paid channel and the duration of time for the promotional offer. The reduction in the subscription fee may be a certain percentage (e.g., between 5 percent and 100 percent) or a certain amount. At block 1806, processing logic associates the reduction in the subscription fee and the duration of time for the promotional offer with the paid channel (e.g., a channel data store).

Subsequently, processing logic checks whether the duration of the promotional offer has expired (block 1808). Processing logic can perform this check periodically (e.g., once a day) until the duration of the promotional offer expires. When the duration of the promotional offer expires, processing logic terminates the promotional offer (block 1810). Terminating the promotional offer may involve deleting the offer or disabling the offer (e.g., to be able to use it at a later time). During the duration of the promotional offer, end users can subscribe to the paid channel at the reduced fee. The reduced fee may last during the entire subscription or during a limited time period (e.g., as specified by the channel curator).

In some implementations, a curator of the paid channel can change the content of the paid channel at any time by adding a new media item and/or removing an existing media item, and a subscriber of the paid channel is immediately (without any noticeable delay) provided with access to the added media item and/or is immediately denied access to the removed media item.

Figure 19:
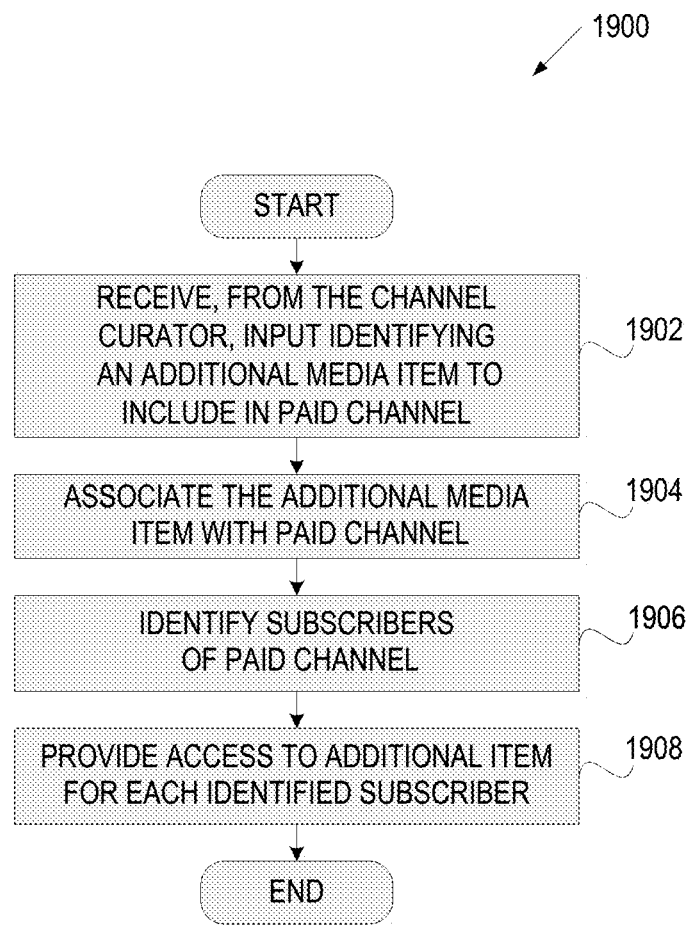
FIG. 19 is a flow diagram illustrating a method for modifying content of a paid channel in an internet-based content platform, in accordance with some embodiments of the present disclosure.

FIG. 19 is a flow diagram illustrating a method 1900 for modifying content of a paid channel in an internet-based content platform, in accordance with some embodiments of the present disclosure. In one implementation, method 1900 may be performed by a channel curator subsystem, as illustrated in FIGS. 1 and 16.

Referring to FIG. 19, method 1900 begins at block 1902 where processing logic receives, from a channel curator, input identifying an additional media item to include in a paid channel of the channel curator. At block 1904, processing logic associates the additional media item with the paid channel (e.g., in a channel data store). At block 1906, processing logic identifies subscribers of the paid channel. At block 1908, processing logic provides access to the additional item for each identified subscriber. Access to the additional item can be provided right after (without any noticeable or substantial delay) receiving the channel curator's input identifying the additional media item. Subscribers viewing a GUI listing media items of the paid channel, can see in real time the addition of the new media item to the channel listing. For example, a subscriber can see the addition of the new media item in the subscriber's feed or on the subscriber's channel GUI. In addition, the subscriber can see the new media item in his or her channel subscription list, in a result of a search query, etc.

The additional media item may be a paid media item or a free media item. In some implementations, if existing media items of the channel are free, the addition of a paid media item can convert the channel into a paid channel and the channel curator may be required to define subscription parameters for this paid channel as discussed above.

A channel curator may offer subscribers different advertising attributes for different fees. Advertising attributes can be created or set by a channel curator when the channel curator creates or defines a channel. The channel curator can also modify advertising attributes for a channel after the channel has been created or defined. Advertising attributes can include, for example, an advertising attribute that decreases a number of advertisements presented to the user when the user consumes media items of the channel. Other examples of subscriber advertising attributes can include a decrease of an aggregate length of time advertisements are presented to the user when the user consumes media items of the channel, a presentation of advertisements of a specific category, a reduction of a number of advertisements from a category, a frequency for presenting an advertisement, a duration for presenting an advertisement, or an option to skip an advertisement presentation within the channel, etc.

Figure 20:
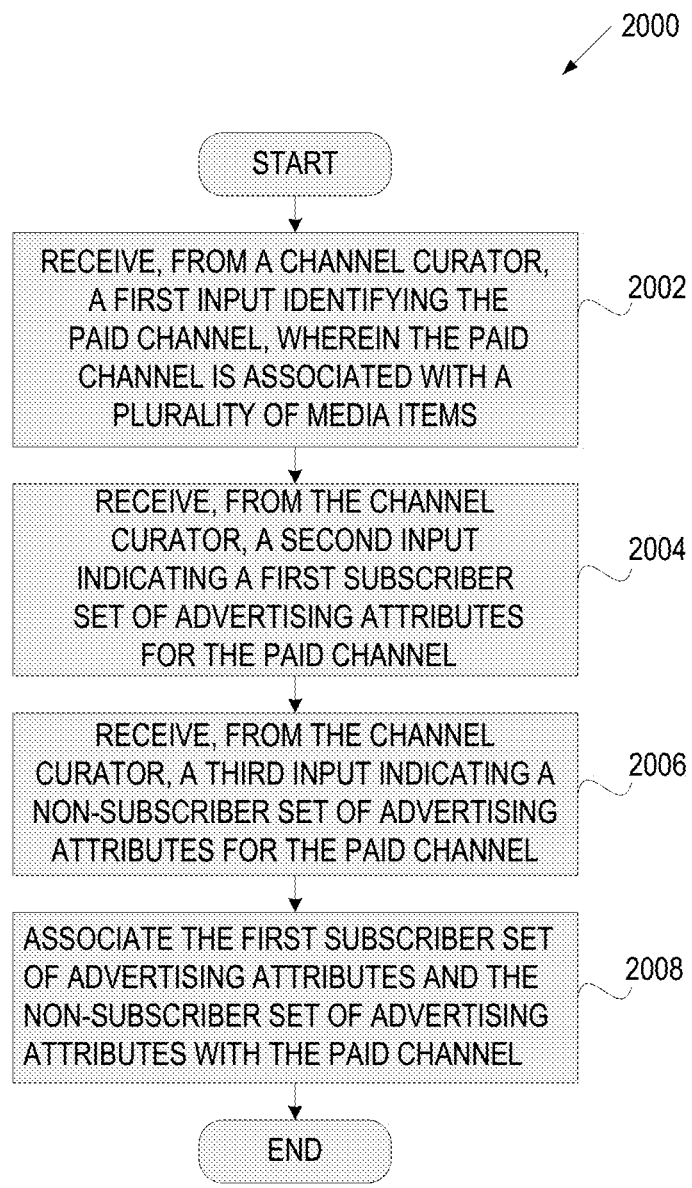
FIG. 20 is a flow diagram illustrating a method for defining advertisement based subscription options for a paid channel in an internet based content platform, in accordance with some embodiments of the present disclosure.

FIG. 20 is a flow diagram illustrating a method 2000 for defining advertisement based subscription options for a paid channel in an internet based content platform, in accordance with some embodiments of the present disclosure. In one implementation, method 2000 may be performed by a channel curator subsystem, as illustrated in FIGS. 1 and 16.

Referring to FIG. 20, method 2000 begins at block 2002 where processing logic receives, from a channel curator, input identifying a paid channel of the channel curator. At block 2004, processing logic receives, from the channel curator, input indicating a subscriber set of advertising attributes for the paid channel. For example, the processing logic may receive input indicating that one advertisement should be presented to a user when the user is subscribed to the channel and consumes media items from the paid channel.

At block 2006, processing logic receives, from the channel curator, input indicating a non-subscriber set of advertising attributes for the paid channel. For example, the processing logic may receive input indicating that three advertisements should be presented to a user when the user is not subscribed to the channel and consumes media items from the paid channel.

At block 2008, processing logic associates the subscriber set of advertising attributes and the non-subscriber set of advertising attributes with the paid channel. For example, referring back to FIG. 1, the processing logic may associate subscriber set of advertising attributes with a subscription level (e.g., a subscription offer) associated with the paid channel and may associate the non-subscriber set of advertising attributes with the paid channel (e.g., may store the non-subscriber set of advertising attributes with the paid channel in the channel data 160).

A channel curator may offer subscribers different types of access to channel content for different fees. The types of access can be created or set by a channel curator when the channel curator creates or defines a channel. The channel curator can also modify available types of access for a channel after the channel has been created or defined. For example, the channel curator can set an access type that permits users to pay for offline access when a user subscribes to the channel. For example, when a user elects an offline access type of access, the user can have access to media items of a channel when the user device is not connected to the internet. Another type of access can be a quality characteristic (e.g., a video resolution or display size) when consuming media items of the channel. For example, a quality characteristic type of access can be an option to view all media items of the channel in 1080p resolution or higher. Another type of access can include allowing access to media items of the channel from multiple user devices. For example, access to the content of the channel can be allowed from the user's personal computer, tablet and smartphone. A further type of access can include offline access to media items of the channel. Other types of access can include adding subtitles to or changing a language of one or more media items in the channel. For example, a user can pay for access to a movie dubbed in the Mongolian language or with Mongolian subtitles. Another type of access can include allowing a user to block specific media items or channels based one some criteria, such as on an individual or categorical basis. For example, a user can choose to have movies and shows with an "R" rating be blocked or a user can choose to have specific shows or movies to be blocked.

Figure 21:
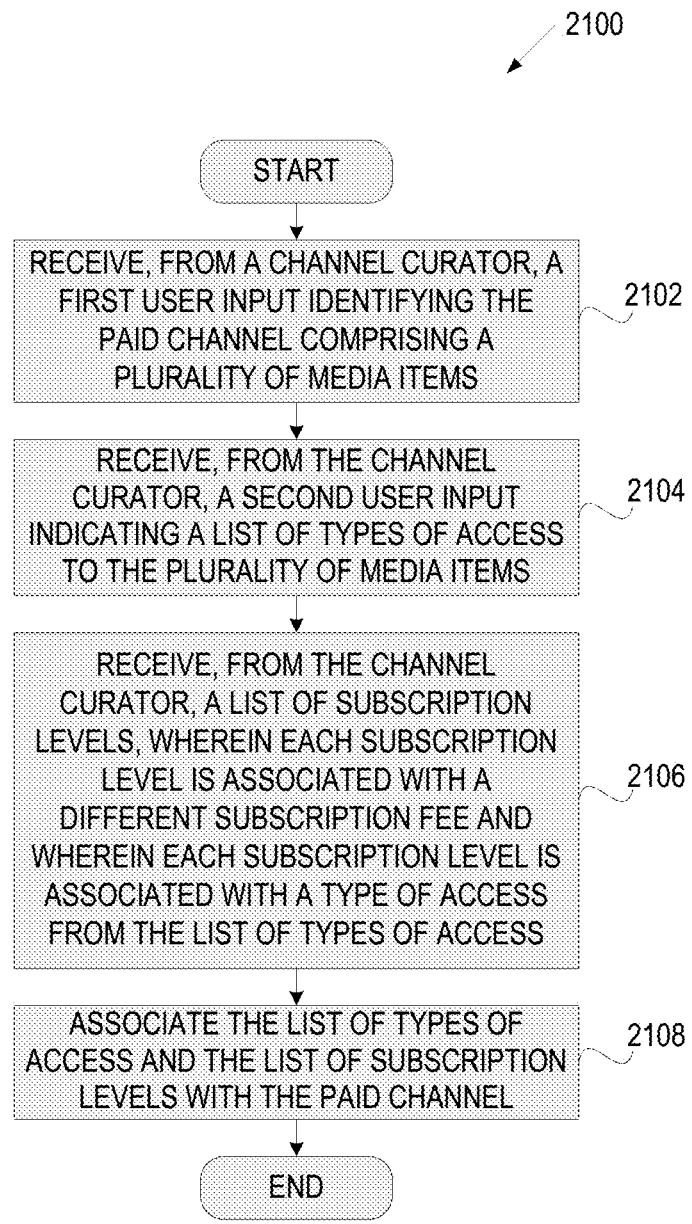
FIG. 21 is a flow diagram illustrating a method defining access-based subscription options for a paid channel in an internet based content platform, in accordance with some embodiments of the present disclosure.

FIG. 21 is a flow diagram illustrating a method 2100 defining access-based subscription options for a paid channel in an internet based content platform, in accordance with some embodiments of the present disclosure. In one implementation, method 2100 may be performed by a channel curator subsystem, as illustrated in FIGS. 1 and 16.

Referring to FIG. 21, method 2100 begins at block 2102 where processing logic receives, from a channel curator, input identifying a paid channel of the channel curator. At block 2104, processing logic receives, from the channel curator, input indicating a list of types of access to the media items of the paid channel. For example, the channel curator may provide input indicating that subtitles, different languages, and multiple quality levels are allowed for media items in the paid channel.

At block 2106, processing logic receives, from the channel curator, a list of subscription levels, where each subscription level is associated with a different subscription fee and where each subscription level is associated with a type of access from the list of types of access. For example, the processing logic may receive data indicating two subscription levels, the subscription fees for each of the two subscription levels, and types of access allowed by each of the two subscription levels (e.g., first subscription level may not allow offline access to media items but the second subscription level may allow offline access to media items).

At block 2008, processing logic associates the list of types of access and the list of subscription levels with the paid channel. For example, the processing logic may store information in the subscription level data 180 indicating that the paid channel as multiple subscription levels and the types of access allowed by each of the multiple subscription levels.

A channel curator may define a composite channel. A composite channel can include one or more component channels and/or one or more media items that are not part of any component channel. A component channel refers to an individual channel that is part of a package represented by a composite channel. The composite channel may include component channels having different content types. For example, a user interested in a musician may want to subscribe to a channel that includes the musician's music videos, the musician's music, a blog about the musician, a newsletter about the musician, tweets of the musician, social network posts by or about the musician, etc.

In some implementations, all component channels and media items of a composite channel can have the same advertising attributes. In other implementation, when the composite channel includes two component channels, the two component channels can have different advertisement attributes. For example, one channel can be a premium movie channel that users are likely to watch. Since viewership is likely to be high, this channel can have a full complement of advertisements. A second channel, for example, can include movies that are not as likely to draw in users. In an effort to attract users, the second channel can have fewer or even no advertisements. Similarly, when the composite channel includes a combination of one or more component channels and standalone media items, the component channels can have different advertisement attributes than each other and can also have different advertisement attributes than the standalone media items. In one implementation, subscriber fees can vary for different subscription levels. For example, a subscription level that removes all advertisements from all component channels and media items of a composite channel can have a different subscriber fee than for a subscription level that only reduces the number of advertisements or removes all advertisements of a subset of component channels. Similarly, a subscriber fee for some subscription levels that unlock certain types of access can be different than for subscription levels that unlock other types of access. For example, a subscriber level that provides a user with offline access to media items of the composite channel can be different than a subscriber fee to present one or more media items in a different language.

In some implementations, all component channels and media items of a composite channel can have the same type of access. In other implementations, when the composite channel includes two component channels, the two component channels can have different types of access. For example, one channel may be accessed offline, while another may not. The subscription level can be associated with different subscription fees for different types of access to the composite channel. Offering different subscription levels provides users with greater flexibility to select content and channel characteristics that better match their personal needs.

Figure 22:
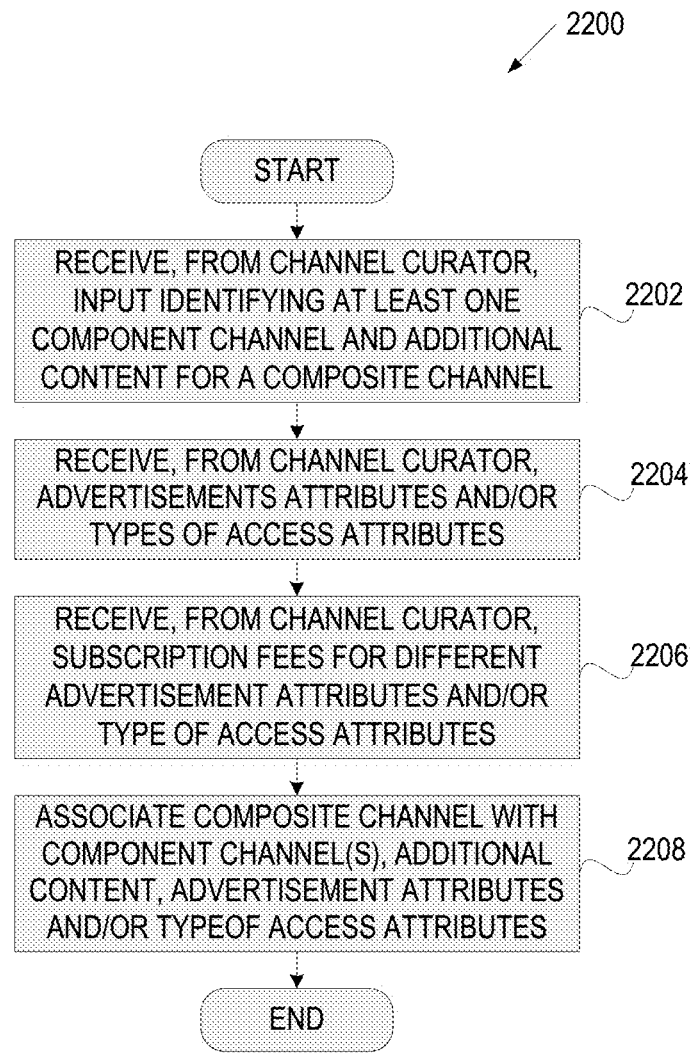
FIG. 22 is a flow diagram illustrating a method for defining a composite channel in an internet based content platform, in accordance with some embodiments of the present disclosure.

FIG. 22 is a flow diagram illustrating a method 2100 for defining a composite channel in an internet based content platform, in accordance with some embodiments of the present disclosure. In one implementation, method 2100 may be performed by a channel curator subsystem, as illustrated in FIGS. 1 and 16.

Referring to FIG. 22, method 2100 begins at block 2102 where processing logic receives, from a channel curator, input identifying at least one component channel and additional content for a composite channel. The additional content may include one or more standalone media items that are included in the composite channel independently of any component channel.

At block 2204, processing logic receives, from the channel curator, different advertisement attributes and/or different types of content access attributes. For example, the processing logic may receive input indicating different advertisement numbers, different advertisement durations, and different languages for media items.

At block 2206, processing logic receives, from the channel curator, different subscription fees for different advertisement attributes and/or different types of content access attributes. For example, the processing logic may receive input indicating that the price for a subscription that presents no advertisements to the user and allows offline access should be $10.00 a month, but that a different subscription that presents three advertisements (per media item) to the user and does not allow offline access should be $3.00 a month.

At block 2208, processing logic associates the composite channel with component channel(s) and additional content, as well as different subscription fees and corresponding advertisement attributes and/or types of access attributes.

Figure 23:
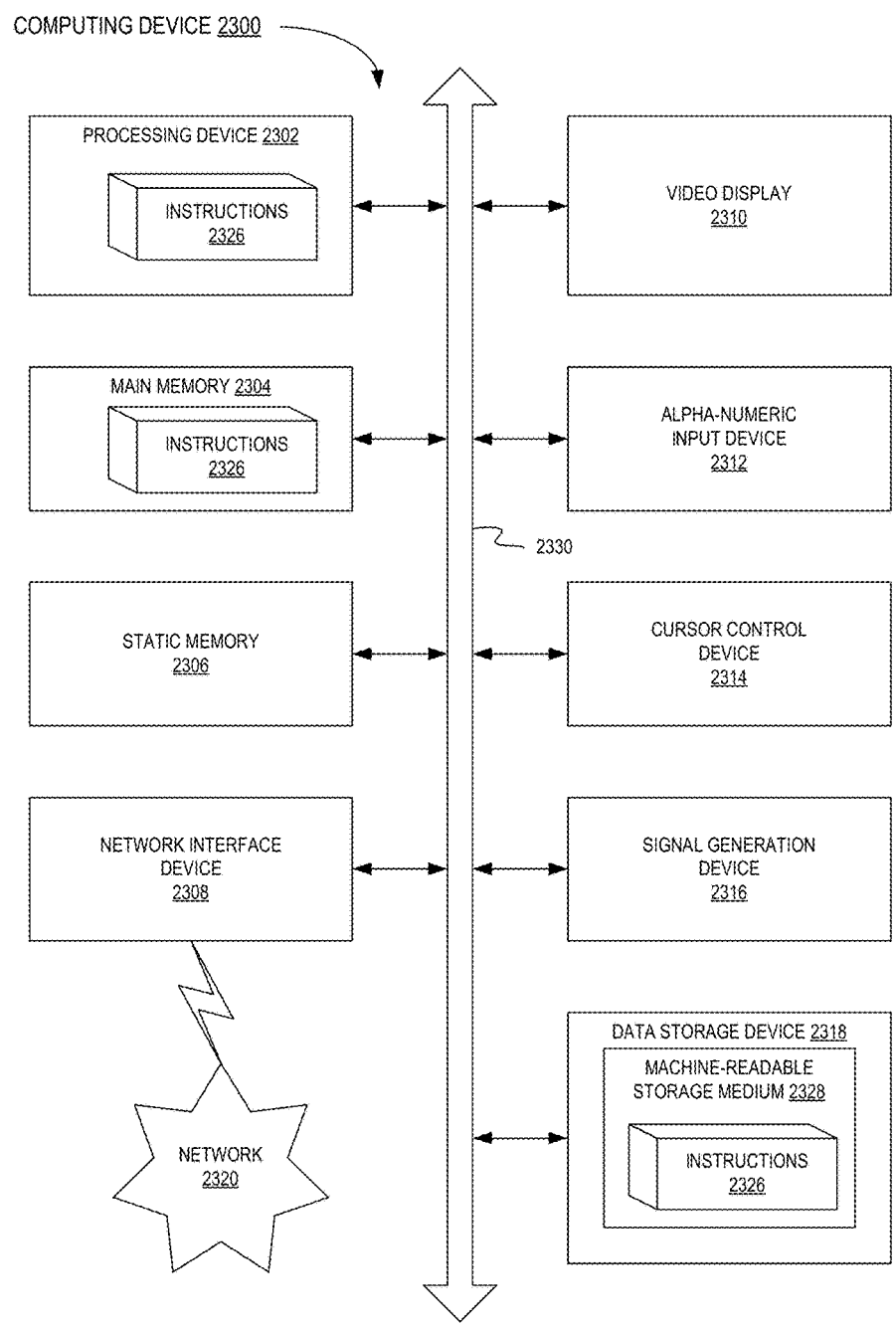
FIG. 23 illustrates block diagram of an example computing device that may perform one or more of the operations described herein.

FIG. 23 illustrates a diagrammatic representation of a machine in the example form of a computing device 2300 within which a set of instructions, for causing the machine to perform any one or more of the methodologies discussed herein, may be executed. The computing device 2300 may be a mobile phone, a smart phone, a netbook computer, a rackmount server, a router computer, a server computer, a personal computer, a mainframe computer, a laptop computer, a tablet computer, a desktop computer etc., within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computing device 2300 includes a processing device (e.g., a processor) 2302, a main memory 2304 (e.g., read-only memory (ROM), flash memory, dynamic random access memory (DRAM) such as synchronous DRAM (SDRAM)), a static memory 2306 (e.g., flash memory, static random access memory (SRAM)) and a data storage device 2318, which communicate with each other via a bus 2330.

Processing device 2302 represents one or more general-purpose processing devices such as a microprocessor, central processing unit, or the like. More particularly, the processing device 2302 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 2302 may also be one or more special-purpose processing devices such as an application specific integrated circuit (ASIC), a field programmable gate array (FPGA), a digital signal processor (DSP), network processor, or the like. The processing device 2302 is configured to execute instructions 2326 for performing the operations and steps discussed herein.

The computing device 2300 may further include a network interface device 2308 which may communicate with a network 2320. The computing device 2300 also may include a display device 2310 (e.g., a liquid crystal display (LCD) or a cathode ray tube (CRT)), an alphanumeric input device 2312 (e.g., a keyboard), a cursor control device 2314 (e.g., a mouse) and a signal generation device 2316 (e.g., a speaker). In one implementation, the display device 2310, the alphanumeric input device 2312, and the cursor control device 2314 may be combined into a single component or device (e.g., an LCD touch screen).

The data storage device 2318 may include a computer-readable storage medium 2328 on which is stored one or more sets of instructions 2326 (e.g., channel curator subsystem) embodying any one or more of the methodologies or functions described herein. The instructions 2326 may also reside, completely or at least partially, within the main memory 2304 and/or within the processing device 2302 during execution thereof by the computing device 2300, the main memory 2304 and the processing device 2302 also constituting computer-readable media. The instructions may further be transmitted or received over a network 2320 via the network interface device 2308.

While the computer-readable storage medium 2328 is shown in an example embodiment to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media.

In the above description, numerous details are set forth. It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "associating," "preventing," "disassociating," "creating," "determining," "requesting," "providing," "adding," "removing," "presenting," "recording," "storing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. As used herein are meant as labels to distinguish among different elements and may not necessarily have an ordinal meaning according to their numerical designation.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

The above description sets forth numerous specific details such as examples of specific systems, components, methods and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth above are merely examples. Particular implementations may vary from these example details and still be contemplated to be within the scope of the present disclosure.

It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method of providing a graphical user interface (GUI) to manage access to media items of a first channel and transform the first channel to a composite channel in a network-based content platform, the method comprising:

receiving, from a channel curator via the GUI, a first input identifying a paid media item to include in the first channel with the paid subscription, the first input defining the paid media item and specifying, via an item paid subscription indicator, that the paid media item is part of the paid subscription, wherein the item paid subscription indicator is a GUI element represented as a checkbox that is selected by the first input of the channel curator to graphically illustrate that a respective video is the paid media item;

associating the paid media item with the first channel;

receiving, from the channel curator via the GUI, a second input indicating a subscription fee for the paid subscription to the first channel and a duration of time for the paid subscription to the first channel;

associating the subscription fee and the duration of time for the paid subscription with the first channel;

providing, by a processing device, the first channel including the paid media item for subscription by end users of the network-based content sharing platform, wherein the paid media item is not allowed to be consumed by the end users of the network-based content sharing platform during the duration of time without the paid subscription to the first channel;

subsequent to providing the first channel for subscription by the end users of the network-based content sharing platform, receiving a third user input of the channel curator to transform the respective video to a free media item by deselecting the item paid subscription indicator represented as the checkbox in the GUI, wherein the free media item is allowed to be consumed by the end users of the network-based content platform without any subscription to the first channel;

receiving a fourth user input of the channel curator to transform the first channel into the composite channel via a composite channel transformation GUI control in the GUI;

in response to the fourth input of the channel curator via the composite channel transformation GUI control in the GUI:

providing, for presentation in the GUI together with the composite channel transformation GUI control, a composite channel menu including (i) a component channel GUI element to receive an identifier of at least one second channel to be added to the composite channel as at least one component channel, wherein the composite channel menu further includes (ii) a composite channel creation GUI control to receive a channel curator request to complete a creation of the composite channel, and (iii) a composite channel cancellation GUI control to receive a channel curator request to cancel the creation of the composite channel;

receiving a fifth user input of the channel curator to specify, via a channel paid subscription indicator, whether the second channel is to be a free channel or a paid channel when added to the composite channel; and transforming, by the processing device, the first channel into the composite channel comprising the first channel as a paid channel, and the second channel as either a free channel or a paid channel in accordance with the selected channel paid subscription indicator.

2. The method of claim 1, further comprising:
receiving, from the channel curator, a sixth input of a second duration of time for a temporary subscription to the first channel, wherein the temporary subscription is free to an end user of the internet-based content platform for the second duration of time.

3. The method of claim 1, wherein the second input further indicates a geographical location for the subscription.

4. The method of claim 1, further comprising: receiving, from the channel curator, a sixth input indicating a reduction in the subscription fee for the paid subscription to the first channel and a second duration of time for the reduction; and
associating the reduction in the subscription fee and the second duration of time for the reduction with the first channel.

5. The method of claim 1, further comprising: receiving a sixth input from the channel curator indicating that the subscription fee and the duration of time should be disabled; and
preventing end users from subscribing to the first channel based on the subscription fee and the duration of time.

6. The method of claim 1, further comprising: receiving a sixth input from the channel curator indicating that the subscription fee and the duration of time should be deleted; and
disassociating the subscription fee and the duration of time for the subscription with the first channel.

7. The method of claim 1, further comprising:
receiving, from the channel curator, a sixth input identifying an additional media item to include in the first channel; and
associating the additional media item with the first channel.

8. The method of claim 1, further comprising: receiving, from the channel curator, a sixth input identifying an additional media item to remove from the first channel; and
disassociating the additional media from the first channel.

9. The method of claim 1, further comprising: creating the first channel with the paid subscription.

10. The method of claim 1, wherein each media item associated with the first channel comprises at least one of a video item, an audio item, an image, a blog entry, a tweet, a social network post, an online publication, a software program, or an online video game.

11. The method of claim 1, further comprising: receiving, from an end user, a selection of one of a plurality of media items associated with the first channel;
determining whether the one of the plurality of media items is a free item or a paid item;
when the one of the plurality of media items is a paid item, requesting subscription information of the end user; and when the one of the plurality of media items is a free item, providing access to the at least one free media item to the end user.

12. The method of claim 1, wherein the at least one free media item is not a preview of any of the at least one paid item.

13. The method of claim 1, wherein the first channel comprises one or more of a video hosting service, a video sharing service, a video broadcaster, a content creation service, a content rental service, a content purchasing service, a television service, or a television broadcaster.

14. The method of claim 1, wherein the composite channel includes at least one media item that is not part of any component channel.

15. An apparatus comprising:
a memory; and
a processing device coupled to the memory, the processing device configured to: receive, from a channel curator via a user interface, a first input identifying a paid media item to include in a first channel with a paid subscription, the first input defining the paid media item and specifying, via an item paid subscription indicator, that the paid media item is part of the paid subscription, wherein the item paid subscription indicator is a graphical user interface (GUI) element represented as a checkbox that is selected by the first input of the channel curator to graphically illustrate that a respective video is the paid media item;
associate the paid media item with the first channel;
receive, from the channel curator via the user interface, a second input indicating a subscription fee for the paid subscription to the first channel and a duration of time for the paid subscription to the first channel;
associate the subscription fee and the duration of time for the paid subscription with the first channel;
provide the first channel including the paid media item for subscription by end users of a network-based content sharing platform, wherein the paid media item is not allowed to be consumed by the end users of the network-based content sharing platform during the duration of time without the paid subscription to the first channel;
subsequent to providing the first channel for subscription by the end users of the network-based content sharing platform, receive a third user input of the channel curator to transform the respective video to a free media item by deselecting the item paid subscription indicator represented as the checkbox in the user interface, wherein the free media item is allowed to be consumed by the end users of the network-based content platform without any subscription to the first channel;
receive a fourth user input of the channel curator to transform the first channel into the composite channel via a composite channel transformation GUI control in the GUI;
in response to the fourth input of the channel curator via the composite channel transformation GUI control in the GUI:
provide, for presentation in the GUI together with the composite channel transformation GUI control, a composite channel menu including (i) a component channel GUI element to receive an identifier of at least one second channel to be added to the composite channel as at least one component channel, wherein the composite channel menu further includes (ii) a composite channel creation GUI control to receive a channel curator request to complete a creation of the composite channel, and (iii) a composite channel cancellation GUI control to receive a channel curator request to cancel the creation of the composite channel;
receive a fifth user input of the channel curator to select, via a channel paid subscription indicator, whether the second channel is to be a free channel or a paid channel when added to the composite channel; and
transform the first channel into the composite channel comprising the first channel as a paid channel, and the second channel as either a free channel or a paid channel in accordance with the selected channel paid subscription indicator.

16. The apparatus of claim 15, wherein the processing device is further configured to:
receive, from the channel curator, a sixth input of a second duration of time for a temporary subscription to the first channel, wherein the temporary subscription is free to an end user of the internet-based content platform for the second duration of time.

17. The apparatus of claim 15, wherein the processing device is further configured to:
receive, from the channel curator, a sixth input indicating a reduction in the subscription fee for the paid subscription to the first channel and a second duration of time for the reduction; and
associate the reduction in the subscription fee and the second duration of time for the reduction with the first channel.

18. The apparatus of claim 15, wherein the composite channel includes at least one component channel and at least one media item that is not part of any component channel.

19. A non-transitory computer readable storage medium, having instructions stored therein, which when executed, cause a processing device to perform operations comprising:
receiving, from a channel curator via a user interface, a first input identifying a paid media item to include in a first channel with a paid subscription, the first input defining the paid media item and specifying, via an item paid subscription indicator, that the paid media item is part of the paid subscription, wherein the item paid subscription indicator is a graphical user interface (GUI) element represented as a checkbox that is selected by the first input of the channel curator to graphically illustrate that a respective video is the paid media item;
associating the paid media item with the first channel;
receiving, from the channel curator via the user interface, a second input indicating a subscription fee for the paid subscription to the first channel and a duration of time for the paid subscription to the first channel;
associating the subscription fee and the duration of time for the paid subscription with the first channel;
providing the first channel including the paid media item for subscription by end users of a network-based content sharing platform, wherein the paid media item is not allowed to be consumed by the end users of the network-based content sharing platform during the duration of time without the paid subscription to the first channel;
subsequent to providing the first channel for subscription by the end users of the network-based content sharing platform, receiving a third user input of the channel curator to transform the respective video to a free media item by deselecting the item paid subscription indicator represented as the checkbox in the user interface, wherein the free media item is allowed to be consumed by the end users of the network-based content platform without any subscription to the first channel;

receiving a fourth user input of the channel curator to transform the first channel into the composite channel via a composite channel transformation GUI control in the GUI;

in response to the fourth input of the channel curator via the composite channel transformation GUI control in the GUI:

provide, for presentation in the GUI together with the composite channel transformation GUI control, a composite channel menu including (i) a component channel GUI element to receive an identifier of at least one second channel to be added to the composite channel as at least one component channel, wherein the composite channel menu further includes (ii) a composite channel creation GUI control to receive a channel curator request to complete a creation of the composite channel, and (iii) a composite channel cancellation GUI control to receive a channel curator request to cancel the creation of the composite channel;

receiving a fifth user input of the channel curator to select, via a channel paid subscription indicator, whether the second channel is to be a free channel or a paid channel when added to the composite channel; and transforming the first channel into the composite channel comprising the first channel as a paid channel, and the second channel as either a free channel or a paid channel in accordance with the selected channel paid subscription indicator.

20. The non-transitory computer readable storage medium of claim 19, wherein the operations further comprise:

receive, from the channel curator, a sixth input of a second duration of time for a temporary subscription to the first channel, wherein the temporary subscription is free to an end user of the internet-based content platform for the second duration of time.

21. The non-transitory computer readable storage medium of claim 19, wherein the operations further comprise:

receive, from the channel curator, a sixth input indicating a reduction in the subscription fee for the paid subscription to the first channel and a second duration of time for the reduction; and associating the reduction in the subscription fee and the second duration of time for the reduction with the first channel.

22. The non-transitory computer readable storage medium of claim 19, wherein the composite channel includes at least one media item that is not part of any component channel.

* * * * *